US009185068B2

(12) United States Patent
Obradovich et al.

(10) Patent No.: US 9,185,068 B2
(45) Date of Patent: *Nov. 10, 2015

(54) TECHNIQUE FOR EFFECTIVE ORGANIZATION AND COMMUNICATION OF INFORMATION

(75) Inventors: Michael L. Obradovich, San Clemente, CA (US); Steven W. Schebesch, Aliso Viejo, CA (US); John D. Pirtle, Silverado, CA (US); Toby C. Crain, Orange, CA (US)

(73) Assignee: Silver State Intellectual Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,341

(22) Filed: Feb. 27, 2012

(65) Prior Publication Data

US 2012/0202527 A1 Aug. 9, 2012

Related U.S. Application Data

(63) Continuation of application No. 09/910,510, filed on Jul. 19, 2001, now Pat. No. 8,126,960.

(60) Provisional application No. 60/221,628, filed on Jul. 28, 2000, provisional application No. 60/224,448, filed on Aug. 10, 2000, provisional application No. 60/226,825, filed on Aug. 22, 2000.

(51) Int. Cl.
*G06F 15/16* (2006.01)
*H04L 12/58* (2006.01)
(Continued)

(52) U.S. Cl.
CPC .......... *H04L 51/22* (2013.01); *H04L 29/12122* (2013.01); *H04L 51/12* (2013.01);
(Continued)

(58) Field of Classification Search
CPC ... H04L 65/4084; H04L 67/10; H04L 67/306; H04N 21/4751; H04N 21/4532
USPC .................................. 709/201, 203, 213, 216
See application file for complete search history.

(56) References Cited

U.S. PATENT DOCUMENTS 4,350,970 A 9/1982 von Tomkewitsch
4,521,857 A 6/1985 Reynolds, III
(Continued)

FOREIGN PATENT DOCUMENTS

EP 0720003 7/1996
EP 0829704 3/1998
(Continued)

OTHER PUBLICATIONS

Eleftheriadis et al. "User Profile Identification in Future Mobile Telecommunications Systems", IEEE Network, IEEE Inc. New York, U.S. vol. 8, No. 5, Sep./Oct. 1994 (p. 33-39).
(Continued)

*Primary Examiner* — Djenane Bayard
(74) *Attorney, Agent, or Firm* — Klein, O'Neill & Singh, LLP

(57) ABSTRACT

In a communication arrangement in accordance with the invention, a server is employed to collect and organize information for mobile device users according to the user profiles, e.g., personal profile, business profile, vacation profile, etc., which reflect different user personae. Moreover, with the server, incoming messages for the user are organized and stored according to the source of the messages and the user criteria established in the user profiles. Further, information in a mobile device may be organized using electronic information cards, referred to as "E-cards," which facilitate, among others, transfer of information from the mobile device to the server, or other mobile devices to conduct various commercial and data transactions.

76 Claims, 20 Drawing Sheets

(51) Int. Cl.
  *H04L 29/12* (2006.01)
  *H04L 29/06* (2006.01)
  *H04M 3/493* (2006.01)
  *H04M 3/533* (2006.01)
  *H04L 29/08* (2006.01)
  *H04M 3/42* (2006.01)
  *H04W 4/02* (2009.01)
  *H04W 4/18* (2009.01)

(52) U.S. Cl.
  CPC ........ *H04L61/1547* (2013.01); *H04L 63/0853* (2013.01); *H04L 63/102* (2013.01); *H04L 67/04* (2013.01); *H04L 67/30* (2013.01); *H04L 67/306* (2013.01); *H04L 67/42* (2013.01); *H04M 3/42178* (2013.01); *H04M 3/42348* (2013.01); *H04M 3/493* (2013.01); *H04M 3/53333* (2013.01); *H04L 51/38* (2013.01); *H04L 2463/102* (2013.01); *H04M 3/4211* (2013.01); *H04M 3/5335* (2013.01); *H04M 2207/18* (2013.01); *H04W 4/02* (2013.01); *H04W 4/18* (2013.01)

(56) References Cited

U.S. PATENT DOCUMENTS

| | | |
|---|---|---|
| 4,812,843 A | 3/1989 | Champion, III et al. |
| 4,977,509 A | 12/1990 | Pitchford et al. |
| 5,023,934 A | 6/1991 | Wheeless |
| 5,043,736 A | 8/1991 | Darnell et al. |
| 5,075,693 A | 12/1991 | McMillan et al. |
| 5,119,504 A | 6/1992 | Durboraw, III |
| 5,124,915 A | 6/1992 | Krenzel |
| 5,127,674 A | 7/1992 | Lamphere et al. |
| 5,157,614 A | 10/1992 | Kashiwazaki et al. |
| 5,164,904 A | 11/1992 | Sumner |
| 5,189,632 A | 2/1993 | Paajanen et al. |
| 5,225,843 A | 7/1993 | Thompson |
| 5,235,633 A | 8/1993 | Dennison et al. |
| 5,265,024 A | 11/1993 | Crabill et al. |
| 5,267,042 A | 11/1993 | Tsuchiya et al. |
| 5,272,638 A | 12/1993 | Martin et al. |
| 5,295,064 A | 3/1994 | Malec et al. |
| 5,299,132 A | 3/1994 | Wortham |
| 5,334,974 A | 8/1994 | Simms et al. |
| 5,335,276 A | 8/1994 | Thompson et al. |
| 5,406,493 A | 4/1995 | Goto et al. |
| 5,420,592 A | 5/1995 | Johnson |
| 5,432,841 A | 7/1995 | Rimer |
| 5,450,329 A | 9/1995 | Tanner |
| 5,479,351 A | 12/1995 | Woo et al. |
| 5,479,482 A | 12/1995 | Grimes |
| 5,497,339 A | 3/1996 | Bernard |
| 5,504,482 A | 4/1996 | Schreder |
| 5,504,684 A | 4/1996 | Lau et al. |
| 5,517,193 A | 5/1996 | Allison et al. |
| 5,519,403 A | 5/1996 | Bickley et al. |
| 5,523,950 A | 6/1996 | Peterson |
| 5,528,248 A | 6/1996 | Steiner et al. |
| 5,528,493 A | 6/1996 | Potter |
| 5,539,645 A | 7/1996 | Mandhyan et al. |
| 5,543,789 A | 8/1996 | Behr et al. |
| 5,544,061 A | 8/1996 | Morimoto et al. |
| 5,555,286 A | 9/1996 | Tendler |
| 5,559,520 A | 9/1996 | Barzegar et al. |
| 5,559,707 A | 9/1996 | DeLorme et al. |
| 5,572,204 A | 11/1996 | Timm et al. |
| 5,579,535 A | 11/1996 | Orlen et al. |
| 5,600,796 A | 2/1997 | Okamura et al. |
| 5,604,676 A | 2/1997 | Penzias |
| 5,625,668 A | 4/1997 | Loomis et al. |
| 5,625,884 A | 4/1997 | Gitlin et al. |
| 5,627,547 A | 5/1997 | Ramaswamy et al. |
| 5,627,549 A | 5/1997 | Park |
| 5,630,068 A | 5/1997 | Vela et al. |
| 5,638,279 A | 6/1997 | Kishi et al. |
| 5,640,156 A | 6/1997 | Okuda et al. |
| 5,642,285 A | 6/1997 | Woo et al. |
| 5,648,763 A | 7/1997 | Long |
| 5,648,769 A | 7/1997 | Sato et al. |
| 5,652,379 A | 7/1997 | Fukatani |
| 5,654,886 A | 8/1997 | Zereski, Jr. et al. |
| 5,661,652 A | 8/1997 | Sprague et al. |
| 5,663,548 A | 9/1997 | Hayashi et al. |
| 5,673,039 A | 9/1997 | Pietzsch et al. |
| 5,675,732 A | 10/1997 | Majeti et al. |
| 5,677,837 A | 10/1997 | Reynolds |
| 5,680,444 A | 10/1997 | Reeves |
| 5,689,252 A | 11/1997 | Ayanoglu et al. |
| 5,694,514 A | 12/1997 | Evans et al. |
| 5,699,056 A | 12/1997 | Yoshida |
| 5,699,255 A | 12/1997 | Ellis et al. |
| 5,717,748 A | 2/1998 | Sneed, Jr. et al. |
| 5,717,749 A | 2/1998 | Sneed, Jr. et al. |
| 5,719,936 A | 2/1998 | Hillenmayer |
| 5,720,037 A | 2/1998 | Biliris et al. |
| 5,724,316 A | 3/1998 | Brunts |
| 5,727,053 A | 3/1998 | Sizer, II et al. |
| 5,731,997 A | 3/1998 | Manson et al. |
| 5,742,509 A | 4/1998 | Goldberg et al. |
| 5,745,855 A | 4/1998 | Futamura |
| 5,748,106 A | 5/1998 | Schoenian et al. |
| 5,754,938 A | 5/1998 | Herz et al. |
| 5,760,742 A | 6/1998 | Branch et al. |
| 5,767,795 A | 6/1998 | Schaphorst |
| 5,774,070 A | 6/1998 | Rendon |
| 5,774,825 A | 6/1998 | Reynolds |
| 5,774,827 A | 6/1998 | Smith, Jr. et al. |
| 5,781,150 A | 7/1998 | Norris |
| 5,786,789 A | 7/1998 | Janky |
| 5,790,974 A | 8/1998 | Tognazzini |
| 5,792,803 A | 8/1998 | Savin |
| 5,794,174 A | 8/1998 | Janky et al. |
| 5,802,492 A | 9/1998 | DeLorme et al. |
| 5,809,247 A | 9/1998 | Richardson et al. |
| 5,815,683 A | 9/1998 | Vogler |
| 5,819,227 A | 10/1998 | Obuchi |
| 5,835,087 A * | 11/1998 | Herz et al. .................. 715/810 |
| 5,850,618 A | 12/1998 | Suetsugu et al. |
| 5,852,810 A | 12/1998 | Sotiroff et al. |
| 5,864,305 A | 1/1999 | Rosenquist |
| 5,908,464 A | 6/1999 | Kishigami et al. |
| 5,917,405 A | 6/1999 | Joao |
| 5,919,246 A | 7/1999 | Waizmann et al. |
| 5,929,774 A | 7/1999 | Charlton |
| 5,933,100 A | 8/1999 | Golding |
| 5,938,721 A | 8/1999 | Dussell et al. |
| 5,944,769 A | 8/1999 | Musk et al. |
| 5,946,626 A | 8/1999 | Foladare et al. |
| 5,948,040 A | 9/1999 | DeLorme et al. |
| 5,950,173 A | 9/1999 | Perkowski |
| 5,963,956 A | 10/1999 | Smartt |
| 5,982,298 A | 11/1999 | Lappenbusch et al. |
| 5,999,124 A | 12/1999 | Sheynblat |
| 5,999,877 A | 12/1999 | Takahashi et al. |
| 6,014,090 A | 1/2000 | Rosen et al. |
| 6,021,371 A | 2/2000 | Fultz |
| 6,028,550 A | 2/2000 | Froeberg et al. |
| 6,041,311 A | 3/2000 | Chislenko et al. |
| 6,047,327 A | 4/2000 | Tso et al. |
| 6,073,075 A | 6/2000 | Kondou et al. |
| 6,075,874 A | 6/2000 | Higashikubo et al. |
| 6,087,965 A | 7/2000 | Murphy |
| 6,091,956 A | 7/2000 | Hollenberg |
| 6,092,076 A | 7/2000 | McDonough et al. |
| 6,107,939 A | 8/2000 | Sorden |
| 6,107,944 A | 8/2000 | Behr et al. |
| 6,108,540 A | 8/2000 | Sonti et al. |
| 6,119,066 A | 9/2000 | Sugiura et al. |
| 6,122,506 A | 9/2000 | Lau et al. |
| 6,124,825 A | 9/2000 | Eschenbach |
| 6,127,945 A | 10/2000 | Mura-Smith |
| 6,131,066 A | 10/2000 | Ahrens et al. |

(56) References Cited

U.S. PATENT DOCUMENTS

| | | | |
|---|---|---|---|
| 6,131,067 | A | 10/2000 | Girerd et al. |
| 6,133,853 | A | 10/2000 | Obradovich et al. |
| 6,134,501 | A | 10/2000 | Oumi |
| 6,141,610 | A | 10/2000 | Rothert et al. |
| 6,144,920 | A | 11/2000 | Mikame |
| 6,147,598 | A | 11/2000 | Murphy et al. |
| 6,148,261 | A | 11/2000 | Obradovich et al. |
| 6,154,745 | A | 11/2000 | Kari et al. |
| 6,163,749 | A | 12/2000 | McDonough et al. |
| 6,163,753 | A | 12/2000 | Beckmann et al. |
| 6,166,626 | A | 12/2000 | Janky et al. |
| 6,169,955 | B1 | 1/2001 | Fultz |
| 6,173,231 | B1 | 1/2001 | Chojnacki |
| 6,182,067 | B1 | 1/2001 | Presnell et al. |
| 6,184,801 | B1 | 2/2001 | Janky |
| 6,185,427 | B1 | 2/2001 | Krasner et al. |
| 6,188,957 | B1 | 2/2001 | Bechtolsheim et al. |
| 6,192,312 | B1 | 2/2001 | Hummelsheim |
| 6,192,314 | B1 | 2/2001 | Khavakh et al. |
| 6,199,013 | B1 | 3/2001 | O'Shea |
| 6,202,023 | B1 | 3/2001 | Hancock et al. |
| 6,208,934 | B1 | 3/2001 | Bechtolsheim et al. |
| 6,212,392 | B1 | 4/2001 | Fitch et al. |
| 6,212,470 | B1 | 4/2001 | Seymour et al. |
| 6,212,472 | B1 | 4/2001 | Nonaka et al. |
| 6,212,473 | B1 | 4/2001 | Stefan et al. |
| 6,212,550 | B1 | 4/2001 | Segur |
| 6,215,857 | B1 | 4/2001 | Kasiviswanathan |
| 6,215,993 | B1 | 4/2001 | Ulveland |
| 6,216,086 | B1 | 4/2001 | Seymour et al. |
| 6,219,557 | B1 | 4/2001 | Havinis |
| 6,219,614 | B1 | 4/2001 | Uchigaki et al. |
| 6,219,694 | B1 | 4/2001 | Lazaridis et al. |
| 6,222,853 | B1 * | 4/2001 | Marttinen et al. ............ 370/465 |
| 6,266,614 | B1 | 7/2001 | Alumbaugh |
| 6,292,743 | B1 | 9/2001 | Pu et al. |
| 6,321,158 | B1 | 11/2001 | DeLorme et al. |
| 6,332,127 | B1 | 12/2001 | Bandera et al. |
| 6,334,087 | B1 | 12/2001 | Nakano et al. |
| 6,374,237 | B1 | 4/2002 | Reese |
| 6,421,675 | B1 | 7/2002 | Ryan et al. |
| 6,427,121 | B2 | 7/2002 | Brodie |
| 6,466,862 | B1 | 10/2002 | DeKock et al. |
| 6,522,875 | B1 | 2/2003 | Dowling et al. |
| 6,529,143 | B2 | 3/2003 | Mikkola et al. |
| 6,535,743 | B1 | 3/2003 | Kenedy, III et al. |
| 6,546,002 | B1 | 4/2003 | Kim |
| 6,574,734 | B1 | 6/2003 | Colson et al. |
| 6,603,969 | B1 | 8/2003 | Vuoristo et al. |
| 6,680,694 | B1 | 1/2004 | Knockeart et al. |
| 6,697,842 | B1 * | 2/2004 | Smith et al. ................... 709/206 |
| 6,707,421 | B1 | 3/2004 | Drury et al. |
| 6,745,188 | B2 | 6/2004 | Bradburn |
| 6,954,735 | B1 | 10/2005 | Djupsjobacka et al. |
| 7,107,269 | B2 | 9/2006 | Arlein et al. |
| 7,130,630 | B1 | 10/2006 | Enzmann et al. |
| 7,136,634 | B1 * | 11/2006 | Rissanen et al. ........... 455/422.1 |
| 7,840,341 | B1 | 11/2010 | Sato et al. |
| 2002/0007407 | A1 * | 1/2002 | Klein ........................... 709/225 |

FOREIGN PATENT DOCUMENTS

| | | |
|---|---|---|
| EP | 0853287 | 7/1998 |
| GB | 2278196 | 11/1994 |
| JP | 01-284889 | 11/1989 |
| JP | 04-261576 | 2/1991 |
| JP | 07-261661 | 10/1995 |
| JP | 08-111725 | 4/1996 |
| JP | 08-138193 | 5/1996 |
| JP | 08-145705 | 6/1996 |
| JP | 08-184455 | 7/1996 |
| JP | 08-510578 | 11/1996 |
| JP | 09-130861 | 5/1997 |
| JP | 09-229694 | 9/1997 |
| JP | 9-231263 | 9/1997 |
| JP | 11-257991 | 9/1999 |
| WO | WO 96/07110 | 3/1996 |
| WO | WO 98/26395 | 6/1998 |
| WO | WO 99/09374 | 2/1999 |
| WO | WO 99/23591 | 5/1999 |
| WO | WO 99/33293 | 7/1999 |

OTHER PUBLICATIONS

European Search Report dated Jun. 23, 2005 for European Patent Application No. EP 05 00 4271.2-2201, filed Mar. 2, 2005, European Search Report mailed Jul. 5, 2005 (5 pgs.).
American Calcar Inc. "Summons to Attend Oral Proceedings Pursuant to Rule 71(1) EPC" and "Annex to Summons to Oral Proceedings" issued on Dec. 22, 2004 in connection with European Patent Application No. 00972367.7-2201, filed Oct. 27, 2000 (5 pgs.).
American Calcar Inc. "Communication Pursuant to Article 96(2) EPC" issued on Aug. 1, 2003 in connection with European Patent Application No. 0972367.7-2001, filed Oct. 27, 2000 (7 pgs.).
PCT Written Opinion for International Application No. PCT/US00/29520, filed Oct. 27, 2000, Written Opinion dated Aug. 28, 2001 (5 pgs.).
Supplemental Search Report for European Patent Application No. 0972367.7, dated Jan. 21, 2003 (4 pgs.).
U.S. Appl. No. 09/699,031, filed Oct. 27, 2000, Michael L. Obradovich, Office Action Mar. 21, 2006, Jun. 16, 2005, Dec. 22, 2004, Jun. 22, 2004, Dec. 29, 2003, Jul. 17, 2003, Dec. 20, 2002, Notice of Allowance Sep. 3, 2008.
U.S. Appl. No. 09/910,510, filed Jul. 19, 2001, Obradovich et al, Office Action Mar. 26, 2008, Nov. 15, 2007, Jun. 4, 2007, Oct. 25, 2006, Jul. 24, 2006, Jan. 23, 2006, Notice of Allowance Oct. 19, 2011.
*Silver State Intellectual Technologies, Inc.* v. *TomTom, Inc.* (Case No. 2:11-cv-01581-PMP-PAL): Defendants' Claim Construction Brief, dated Oct. 26, 2012.
*Silver State Intellectual Technologies, Inc.* v. *Garmin International, Inc.* (Case No. 2:11-cv-1578-PMP-RJJ): Garmin's Responsive Claim Construction Brief, dated Oct. 26, 2012.
*Silver State Intellectual Technologies, Inc.* v. *Garmin International, Inc.* (Case No. 2:11-cv-1578-PMP-RJJ) *and TomTom, Inc.* (Case No. 2:11-cv-1581-PMP-PAL): Silver State's Consolidated Opening Claim Construction Brief, dated Sep. 28, 2012.
*Silver State Intellectual Technologies, Inc.* v. *Garmin International, Inc.* (Case No. 2:11-cv-1578-PMP-RJJ) *and TomTom, Inc.* (Case No. 2:11-cv-1581-PMP-PAL): Notice of Amended Joint Claim Construction Chart, dated Sep. 27, 2012.
*Silver State Intellectual Technologies, Inc.* v. *Garmin International, Inc.* (Case No. 2:11-cv-1578-PMP-PAL) *and TomTom, Inc.* (Case No. 2:11-cv-1581-PMP-PAL): Silver State's Consolidated Reply Claim Construction Brief, dated Nov. 9, 2012.
Arikawa, "Personal Dynamic Maps Based on Distributed Georgraphic Information Servers" 1994 Vehicle Navigation & Information Systems Conference Proceedings.
DeLorme "AAA Map'n'Go 4.0 User Guide" Oct. 1998.
"DeLorme's New AAA Map'n'Go 4.0 Takes Family Fun on the Road" PR Newswire, Apr. 20, 1998.
Garmin Corporation "Garmin CPSIII Owner's Manual and Reference" Aug. 1997.
Norman et al., "Integrating Business Listings with Digital Maps for Use in Vehicles," SAE Technical Paper 910062, Feb. 1991, doi:10.4271/910062.
"Planning a road trip, the quick and neat way" HighBeam Research, Medical Economics, Sep. 23 1996. www.highbeam.com/doc/1P3-10244979.html, Retrieved Aug. 5, 2012.
Saricks et al., "Evaluating Effectiveness of Real-Time Advanced Traveler Information Systems Using a Small Test Vehicle Fleet" Transportation Research Record 1588, Paper No. 970585, 1997.
Saricks et al., "Formal Evaluation of the ADVANCE Targeted Deployment," Mar. 27, 1996.
*Silver State Intellectual Technologies, Inc.* v. *Garmin International, Inc.* (Case No. 2:11-cv-1578-ECR-RJJ): Garmin's Preliminary Non-Infringement, Invalidity, and Unenforceability Contentions Under LR 16.1-8 and LR 16.1-9, dated May 16, 2012.

(56) References Cited

OTHER PUBLICATIONS

*Silver State Intellectual Technologies, Inc.* v. *Garmin International, Inc.* (Case No. 2:11-cv-1578-RCJ-RJJ): Plaintiff's Response to Defendants' Contentions Pursuant to Local Rule of Patent Practice LR 16.1-10, dated Jun. 29, 2012.

*Silver State Intellectual Technologies, Inc.* v. *TomTom, Inc.* (Case No. 2:11-cv-01581 PMP/PAL)): TomTom, Inc.'s Preliminary Non-Infringement, Invalidity, and Unenforceability Contentions, dated May 9, 2012.

*Silver State Intellectual Technologies, Inc.* v. *TomTom, Inc.* (Case No. 2:11-cv-01581-PMP-PAL): Plaintiff's Response to Defendant's Contentions Pursuant to Local Rule of Patent Practice LR 16.1-10, dated Jun. 22, 2012.

*Silver State Intellectual Technologies, Inc.* v *TomTom, Inc.* (Case No. 2:11-cv-01581 (PMP/PAL)): TomTom, Inc.'s First Supplemental Non-Infringement, Invalidity, and Unenforceability Contentions, with Appendices 1, A3, A9, B, C3, and C9, dated Jun. 4, 2012.

Zhao, Yilin, "Vehicle Location and Navigation Systems" Artech House, Inc., Mar. 31, 1997.

\* cited by examiner

FIG. 17B

PURCHASE CONFIRMATION RECORDS

START DATE: 1732 — XX-XX-XX
LAST ☐ RECORDS — 1725
END DATE: YY-YY-YY — 1735

| | | | |
|---|---|---|---|
| XX-XX-XX | STAPLES<br>44 BROADWAY<br>NEW YORK, NY | STATIONERY | 12.99 |
| ⋮ | ⋮ | ⋮ | ⋮ |
| YY-YY-YY | GARY'S SHOES<br>5 MAIN STREET<br>SAN JOSE, CA | SHOE PURCHASE | 125.00 |

1741, 1743, 1751, 1753, 1755, 1757

TOTAL: $$$$ — 1761

TECHNIQUE FOR EFFECTIVE ORGANIZATION AND COMMUNICATION OF INFORMATION

CROSS-REFERENCE TO RELATED APPLICATIONS

This application is a continuation of U.S. application Ser. No. 09/910,510 filed on Jul. 19, 2001, which is to issue as U.S. Pat. No. 8,126,960, the disclosure of which is incorporated by reference, which claims the benefits under 35 U.S.C. 119(e) of U.S. Provisional Application No. 60/221,628 filed on Jul. 28, 2000; U.S. Provisional Application No. 60/224,448 filed on Aug. 10, 2000; and U.S. Provisional Application No. 60/226,825 filed on Aug. 22, 2000.

FIELD OF THE INVENTION

The invention relates to a communication system and method, and more particularly to a system and method for providing communication services to a user through a server.

BACKGROUND OF THE INVENTION

Mobile devices such as personal communication systems (PCS) and personal digital assistants (PDA) have been developed to provide access to the Internet and other network-type services. These devices incorporate wireless communications and modem facilities, enabling a user to send and receive electronic mail (e-mail), or to upload and download data through the Internet. Similarly, wireless telephones have been adapted to receive and display textual messages.

However, users of the mobile devices have ever-increasing demand for Internet access through a wireless communication network. In response, more and more wireless communication bandwidth is allocated to such devices to access multimedia (text, audio and/or video) data from the Internet. As wireless communication bandwidth and data transfer rates increase, the increase in the volume of data available to a mobile device quickly overwhelms the capacity of the mobile device. At the same time, this flood of data also overwhelms a user as the user tries to effectively utilize the data collected by the mobile device. Without proper organization and presentation of the collected data, useful and important data often goes unnoticed.

In addition, a user may use multiple mobile devices to conduct daily life. Typically, each mobile device has its own database. It is often desirable that data collected in one database be replicated in other databases especially when the collected data is useful and important to the user. However, due to the incompatibility of the traditional mobile devices, the data replication may only be accomplished by data reentry or re-visiting of information sources. Disadvantageously, the data re-entry is oftentimes labor intensive, and the re-visits are time consuming. Moreover, the user may not be able to recall the previous information sources from which the data was collected, and even if the user is able to re-visit each of those information sources, the data there may have been revised because of the time lag, thus frustrating the data replication effort.

SUMMARY OF THE INVENTION

In accordance with the invention, a centralized communication facility, e.g., a server connected to one or more communication networks, is employed to collect and organize information for a user of a mobile device. For each user, the server collects and organizes the information based on user profiles that reflect different user personae. By collecting and organizing information according to the user profiles in the server, the operation of the mobile device is simplified. In addition, the amount of non-volatile memory required in the mobile device may be reduced, as most of the information is stored in the server, instead. The mobile device obtains the necessary information from the server on an as needed basis.

In addition, the server provides different protocol driver programs for various mobile devices for communications with the server. This being so, the various incompatible mobile devices may share the same information by efficiently downloading it from the server, thereby obviating the need of data re-entry or re-visits of information sources as in prior art. Specifically, during an initial handshake with the server, the mobile device identifies itself to the server, which then downloads the appropriate protocol driver program to the mobile device for its communications with the server.

In an illustrative embodiment, the aforementioned user profiles include, e.g., a personal profile and a business profile. A personal profile reflects the user's personal persona, which includes personal information such as medical and financial records. A business profile reflects a user's business persona, which includes the user's business related information such as the names of contacts with whom the user does business. A user may also establish alternative profiles that reflect other user personae, e.g., vacation or travel profiles. These alternative profiles may include information that reflects a user's vacation or travel preferences, e.g., names and addresses of hotels, restaurants, airlines or airline schedules. This information may also be categorized by location, or by type of entertainment, e.g., theaters, cinemas, etc.

In accordance with another aspect of the invention, the server may obtain, e.g., by searching a network of libraries, information items concerning the location of, and directions to, selected businesses or services. The information items may be presented in textual and/or graphic format. The graphic format may include indications of the locations of the selected businesses or services on navigation maps, which are downloaded for display onto the mobile device. The displayed business or service information items may be selected based on a user profile. Thus, the information items may include the names and locations of restaurants, gas stations, places of interest, scenic viewing areas, etc.

In accordance with yet another aspect of the invention, the server may be used to organize incoming messages to the user based on the source of the messages and user criteria pre-established in the user profiles. For example, the server may selectively perform message storage or call forwarding when the user is not available. In a message storage mode, messages may be identified by their source and stored according to the user specified criteria. The server may then provide different notifications to the user depending upon the source of the messages. In a call forwarding mode, calls originating from a party designated in a personal profile may be directed to a personal message storage area.

In accordance with still yet another aspect of the invention, electronic information cards, referred to as "E-cards," may be used to organize data in the mobile device and to exchange selected data between the server and the mobile device. E-cards may contain information from selected user profiles. For example, a personal E-card may contain information items related to financial records, such as credit card numbers, bank accounts and balances from the user personal profile. A business E-card may contain information items from the user business profile which are related to business.

With the E-card arrangement, selective user information can be distributed among different recipients in an efficient manner.

BRIEF DESCRIPTION OF THE DRAWINGS

Further aspects, features and advantages of the invention will become apparent from the following detailed description taken in conjunction with the accompanying drawings showing illustrative embodiments of the invention, in which;

FIG. 17B illustrates a display of records of credit card transactions on the PCD of FIG. 13;

DETAILED DESCRIPTION

Figure 1:
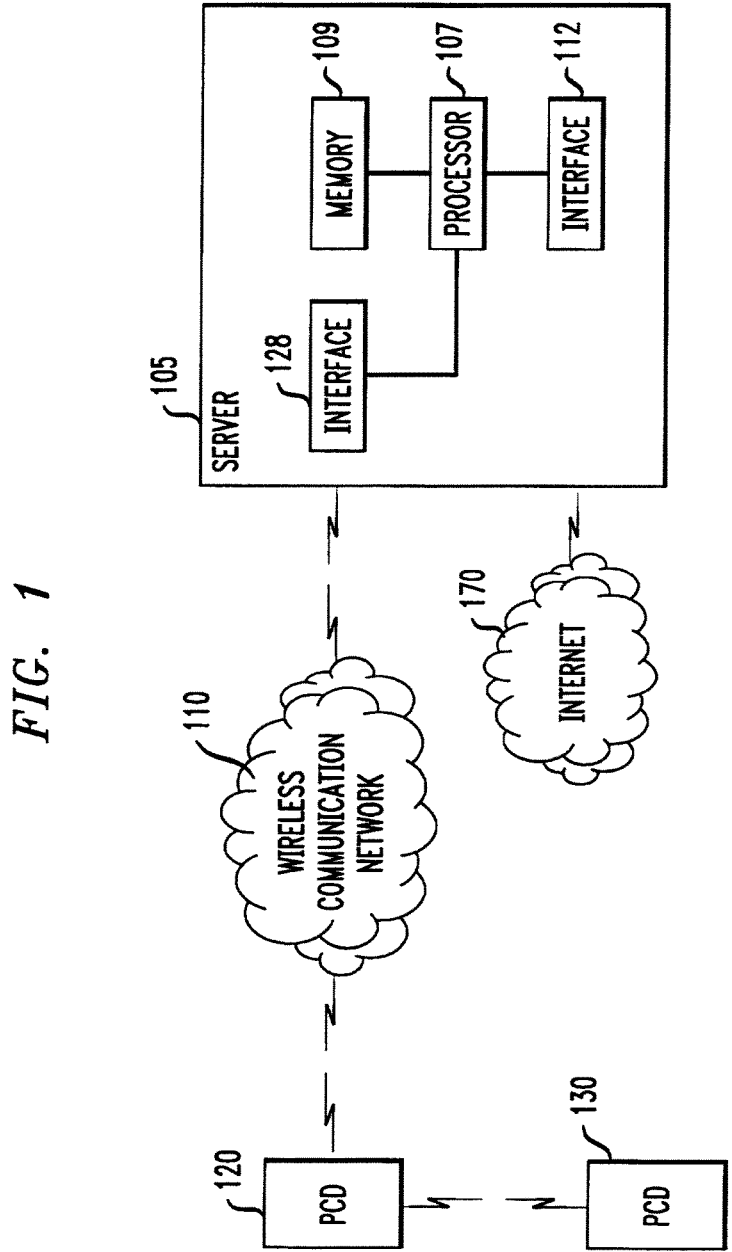
FIG. 1 illustrates an arrangement in accordance with the invention where a centralized communication server is used to help handle the communication needs of a mobile device user.

FIG. 1 illustrates an arrangement embodying the principles of the invention, where server 105 is employed to collect and organize information for users of mobile devices. Advantageously, with the inventive arrangement, the burden of a mobile device in maintaining vast quantities of information is mostly shifted onto server 105 and is thus substantially reduced. In addition, the user information in server 105 may be distributed to different mobile devices upon the user's request, thereby facilitating sharing of the same information among the devices.

In FIG. 1, server 105 includes processor 107, memory 109 and interfaces 112 and 128. Interface 112, including modem facilities, is used to connect server 105 to a communication network, such as Internet 170. Through processor 107, server 105 may communicate with other servers connected to Internet 170. For example, server 105 may request library servers to search for particular information items. Memory 109 is used to store data collected for the users served by server 105. The organization of memory 109 is fully disclosed below.

As would be appreciated, the processing functions of processor 107 are not limited to functions solely thereon, but may be distributed among other processors connected to processor 107. Similarly, memory 109 may also be distributed among other memories and need not be in physical proximity to processor 107.

Through interface 128, server 105 may communicate with mobile devices through wireless communication network 110. These mobile devices include personal communication devices (PCDs) 120 and 130 which are fully described below. It suffices to know for now that the PCD, like a conventional PALM PDA, includes a user interface, touch-screen display and wireless communication capability. PCDs 120 and 130 may also communicate with each other independent of network 110 using the well known Bluetooth technology. The Bluetooth technology was developed to unify the electronics world to allow a variety of cellular phones, PDAs and computers to communicate with one another over short distances in a wireless manner. Each PCD also includes a well known GPS device (not shown) for utilizing signals from a well known global positioning system (GPS) for determining the position of the PCD.

For example, a PCD user may want to visit a fast-food restaurant, e.g., a McDonald's, in the surrounding area, but does not know where one is located. The user may then through PCD 120 enter a request to server 105 to locate the McDonald's in the local area. The location of PCD 120 is determined by the aforementioned GPS device therein. Such location information is provided to server 105, along with the search request including search criteria. Server 105 may then search its own libraries and/or other library servers connected to Internet 170. The search results are then sorted and filtered by processor 107 before they are transmitted to PCD 120 via network 110. The search results may include the address, telephone number and directions to each restaurant within a specified distance from the user, for example. The user may also expand or refine the search criteria to determine additional information items or restrict the amount of information items received. The user may further request server 105 to record the search results for future reference. Thus, the information items once obtained may be retained in server 105 for future use, or for distribution to other devices to share the information items.

Figure 2:
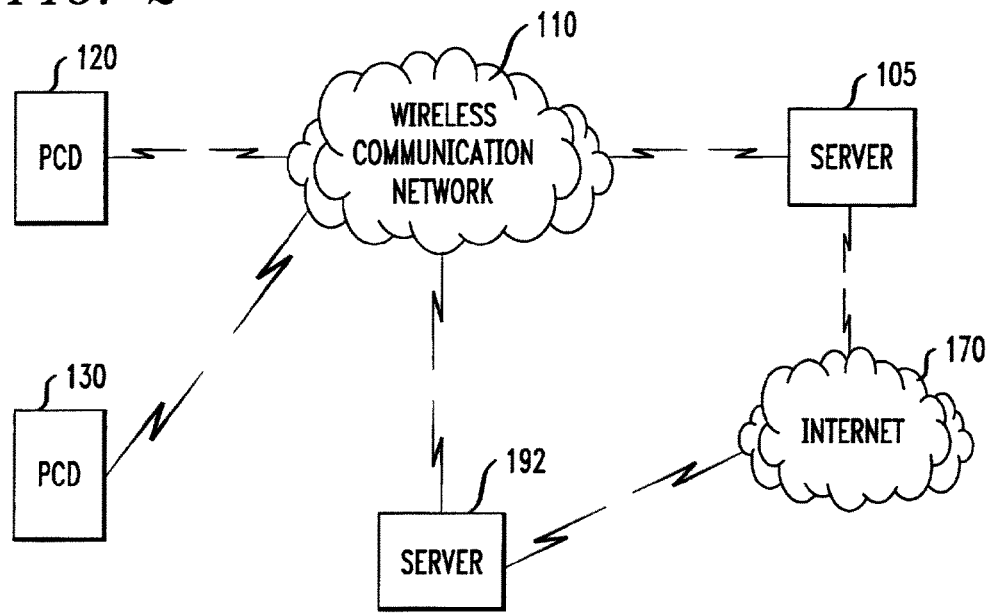
FIG. 2 illustrates an arrangement for transferring information items between a first mobile device user and a second mobile device user in accordance with the invention.

In FIG. 2 server 192, similar to server 105, serves the user of PCD 130, although it would be appreciated that server 105 may provide service for multiple users including the user of PCD 130. Nevertheless, in this example, server 192 is the server for the user of PCD 130, and the user of PCD 120 may want to share information items, stored in server 105 for him/her, with the user of PCD 130. To that end, the user of PCD 120 may issue a request through network 110 to server 105 for forwarding a copy of the selected information items to server 192 for the user of PCD 130. After server 192 receives the information items from server 105 through Internet 170, server 192 then sends a signal, notifying PCD 130 of the receipt of the items. Upon receiving the notification, the user of PCD 130 may request server 192 to download the received information items thereto immediately or at a later time. Advantageously, the transfer of information items between the users does not interfere with their use of PCDs 120 and 130. That is, the users may freely utilize the respective PCDs during the information item transfer which involves servers 105 and 192 only.

Figure 3:
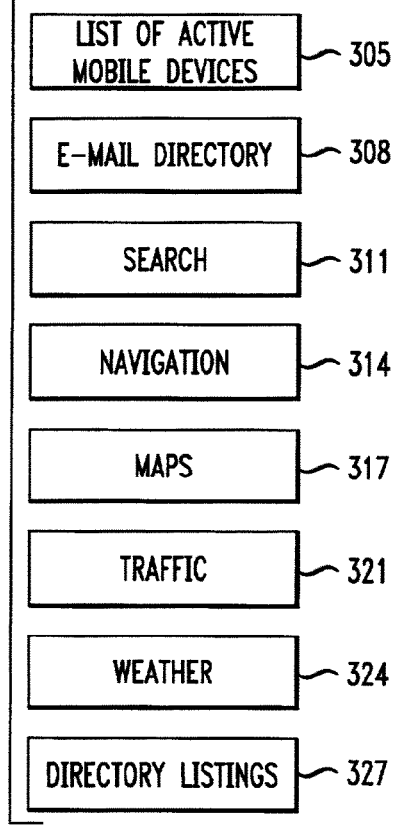
FIG. 3 illustrates exemplary functions performed by the server of FIG. 1.

FIG. 3 illustrates some exemplary functions performed by processor 107 in server 105, which include function 305 tracking a list of active mobile devices served by server 105, e-mail directory function 308, search function 311, navigation function 314, maps function 317, traffic function 321, weather function 324 and directory listings function 327. Specifically, function 305 includes compiling and updating a list of mobile devices currently in communication with server 105. Function 308 includes processing, distributing and maintaining e-mail communication for each user served by server 105. Function 311 includes searching library databases for specified information items. Function 314 includes planning and providing a route between a given source and destination point. Function 317 includes searching databases for maps given designated locations. Function 321 includes obtaining and evaluating traffic information items given designated locations. Function 324 includes obtaining and evaluating weather information items given designated locations. Function 327 includes processing information items for listing in different directories.

With the above functions, for example, server 105 may be used to plan a route from a source location to a destination location, which includes current traffic and weather conditions on the route. The user may utilize PCD 120 to request server 105 to plan such a route. To that end, server 105 obtains source and destination locations from the user through navigation function 314, accesses maps through maps function 317, and extracts information items that are used in formulating the route. The resulting route and navigation instructions may be displayed on PCD 120, which include specific turn-by-turn directions and mileage indications. The resulting route may be based on the mode of transportation, e.g., use of a car or public transportation, walking or biking. Thus, the route is determined depending on such factors as weight restrictions on roads and bridges, the limitations of public transportation, the presence, or lack of, sidewalks, or bicycle paths. The route determination may also take into account roadblocks artificially instituted by the user to avoid certain areas such as an area having a high crime rate. In addition, current traffic and weather conditions may be considered in the route determination by using traffic function 321 and weather function 324, respectively.

Figure 4:
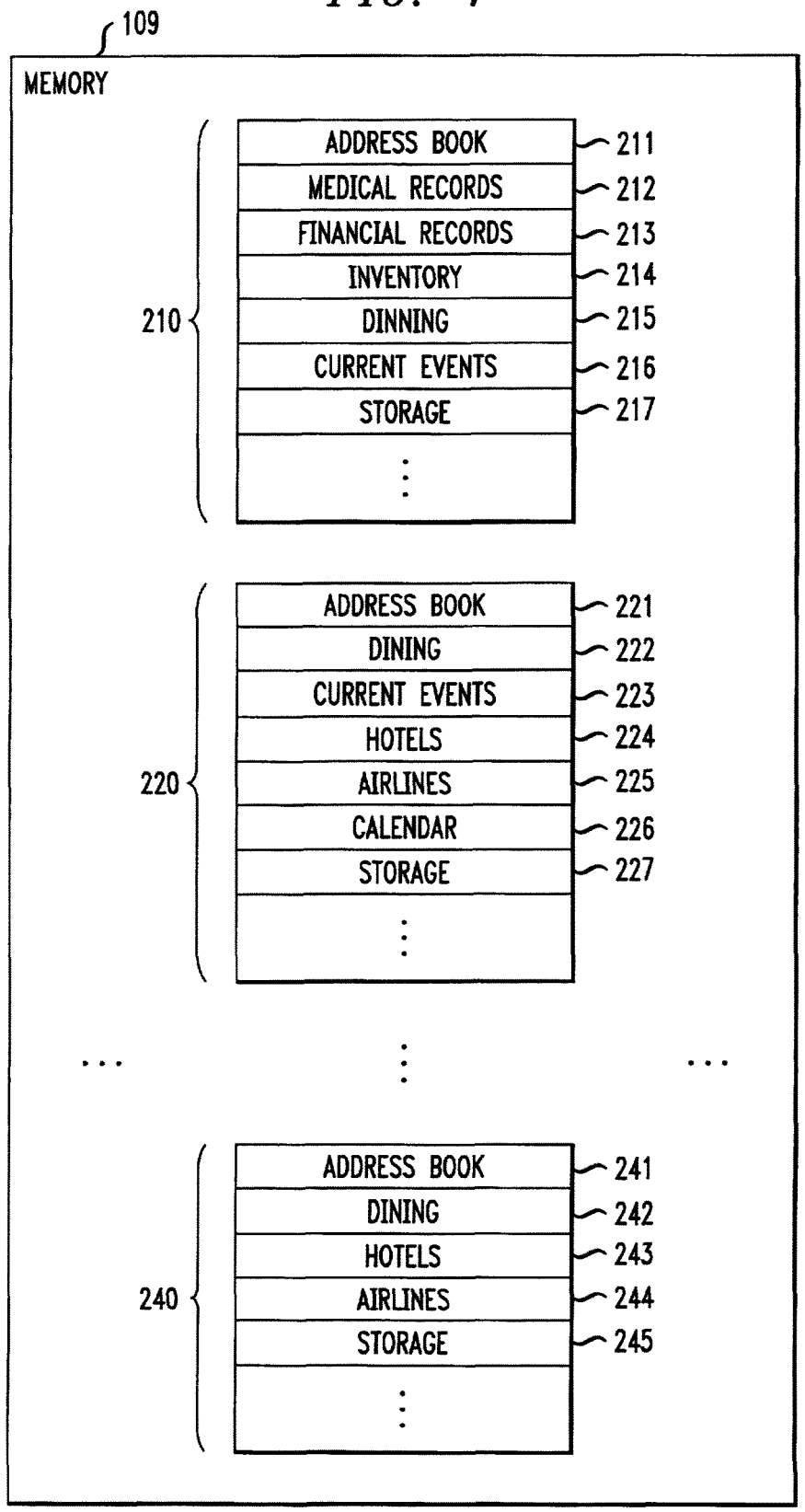
FIG. 4 illustrates profiles of the mobile device user stored in a memory in the server of FIG. 1.

FIG. 4 illustrates use of part of memory space of memory 109 in server 105. In this embodiment, the memory space is divided into partitions designated to different users, respectively. Each partition includes user profiles concerning different personae of the user associated with the partition. Information items for the user are stored in memory 109 according to the user profiles. For example, information items relevant to the personal aspect of the user may be collected and organized in a personal profile. These information items may include contact information of people known socially to the user, or the names of places that are of interest to the user. On the other hand, information items relevant to the business aspect of the user may be collected and organized in a business profile. These information items may include business contact information of clients, vendors, sales personnel, customer service personnel, and contractors; and information concerning restaurants and establishments for entertaining clients, business practices, etc.

Still other profiles can be established to reflect the user's personae with regard to vacationing, travelling or hobbies, e.g., golf and tennis. In the vacation profile, for example, server 105 may record information items regarding restaurants, hotels and areas of interest at designated vacation areas that the user has visited or intends to visit.

Each profile may be further categorized to organize the information in a manner that facilitates the presentation of the collected information. For example, a profile may include categories for restaurants, hotels, and gas stations. These categories may be further categorized into, e.g., restaurant types. As would be appreciated, the categories of each profile may be specified by the user and can be selected differently for each user profile.

As shown in FIG. 4, exemplary profiles are created and stored in memory 109 for a user. These profiles include the user's personal profile 210, business profile 220 and vacation profile 240. Although illustrated as disjoint memory areas, it would be appreciated that the stored information items in each profile may be sequentially stored in memory 109 and may be tagged appropriately to indicate the placement of an information item in a particular profile.

In this illustrated example, personal profile 210 includes files such as address book 211, medical records 212, financial records 213, inventory 214, dining 215, current events 215 and storage 217. Address book 211 may include information items such as names, addresses, e-mail addresses, and telephone numbers of persons who are the user's relatives and friends. Medical records 212 may include information items such as the user's current medical records, current medication and medications that should be avoided. Medical records 212 may also include information items concerning persons whom should be contacted in case of an emergency, e.g., doctor, hospital, family members, etc. Financial records 213 may include information items such as the user's credit card numbers, banking account numbers and balances, names and quantity of stocks and bonds and purchase price, and retirement account information. Inventory 214 may include information items such as serial numbers or warranty information or replacement costs on the user's video cameras, digital cameras, lap top computers, television sets, etc. This information may be useful if a device is lost or stolen. Dining 215 may include information items such as contact information of restaurants for personal dining. This file may further be divided into types of restaurants such as luxury or fast food. Current events 216 may include information items such as new items from different news sources which are of interest to the user. For example, news items may be from different newspapers or sources and may be further divided into type of news, such as sports, stocks, front page, etc. Storage 217 may include personal messages left by those attempting to contact the user. Messages may be left in textual, audio, and/or video format.

Business profile 220, similar to personal profile 210, includes files such as address book 221, dining 222, current events 223, hotels, 224, airlines, 226, calendar 226 and storage 227. Address book 221, dining 222 and current events 223 are similar to those described in regard to personal profile 210. Address book 221 may include information items for contacting business associates, contractors, vendors, suppliers, etc. Similarly, dining 222 may include information items concerning restaurants for business dining. Current events 223 include business related news items. For example, attorneys may collect articles from law journals, and doctors may collect articles from medical journals in this file. Hotels 224 and airlines 225 may include contact information for arranging business-related hotels, airlines and auto rentals. Further, information items concerning corporate rates of hotels, airlines and auto rentals may be included in these files as well. Also included may be user business identification numbers, e.g., frequent flyer numbers and priority club numbers. Calendar 226 includes information items such as meetings, appointments, delivery dates, etc. Similar to storage 217, storage 227 includes business-related messages in text, audio and/or video format left for the user.

Vacation profile 240 includes files such as address book 241, dining 242, hotels 243, airlines 244 and storage 245 which pertain to vacations or leisure travel, but are otherwise similar to those described in regard to personal profile 210 and business profile 220. For example, address book 241 contains information items concerning travel agents, and contacts at vacation locations; dining 242 contains information items concerning restaurants at the vacation locations; hotels 243 contains information items concerning hotels at the vacation locations; airlines 244 contains information items concerning airlines and/or auto rentals for traveling to the vacation locations; and storage 245 contains messages to the user concerning vacations and leisure travel. Thus, with the vacation profile, information items that were obtained about a vacation location, which may be a long time ago, can be easily recalled.

Figure 5:
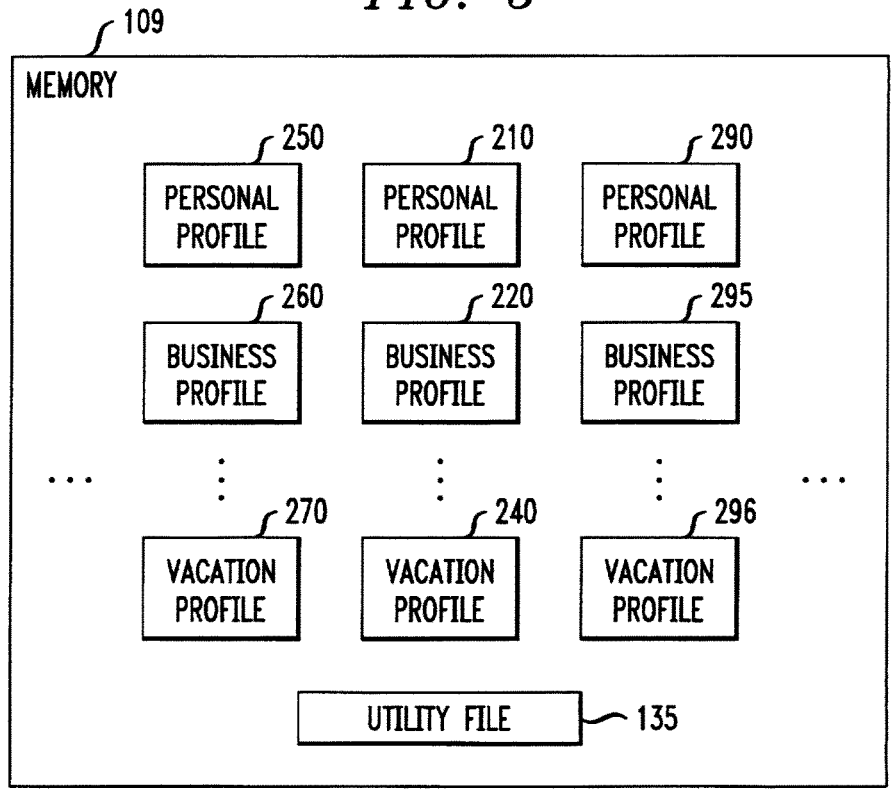
FIG. 5 illustrates contents of the memory in the server of FIG. 1.

FIG. 5 illustrates the partitioning of the memory space of memory 109 to contain the profiles of a plurality of users. In this illustrative example, profiles 210, 220 and 240 are associated with a first user; profiles 250, 260 and 270 are associated with a second user; profiles 290, 295 and 296 are associated with a third user; and so on and so forth.

Further illustrated in memory 109 is utility file 135. File 135 represents a library of protocol driver programs for known mobile devices. These driver programs when run on the mobile devices enable the mobile devices to communicate messages with server 105 in a more efficient format. In an initial handshake with server 105, a mobile device identifies itself to server 105 pursuant to a common, wireless messaging protocol which may be inefficient. After the handshake, server 105 selects from file 135 the latest protocol driver program for that particular mobile device and downloads same to the mobile device. The latter then runs the downloaded driver program, enabling the mobile device to efficiently communicate with server 105 pursuant to the protocol specified by the driver program. Using file 135 to maintain a library of driver programs is advantageous in that information items can be freely shared among mobile devices which may be incompatible with one another. For example, if a user wants to share certain information items in a first mobile device with a second incompatible mobile device, the user can simply use the second device to communicate with server 105 to have the same information items downloaded from server 105 to the second device. The download is efficient through use of the appropriate protocol driver program provided by server 105, without requiring any special, initial installation on the part of the second device.

Figure 6:
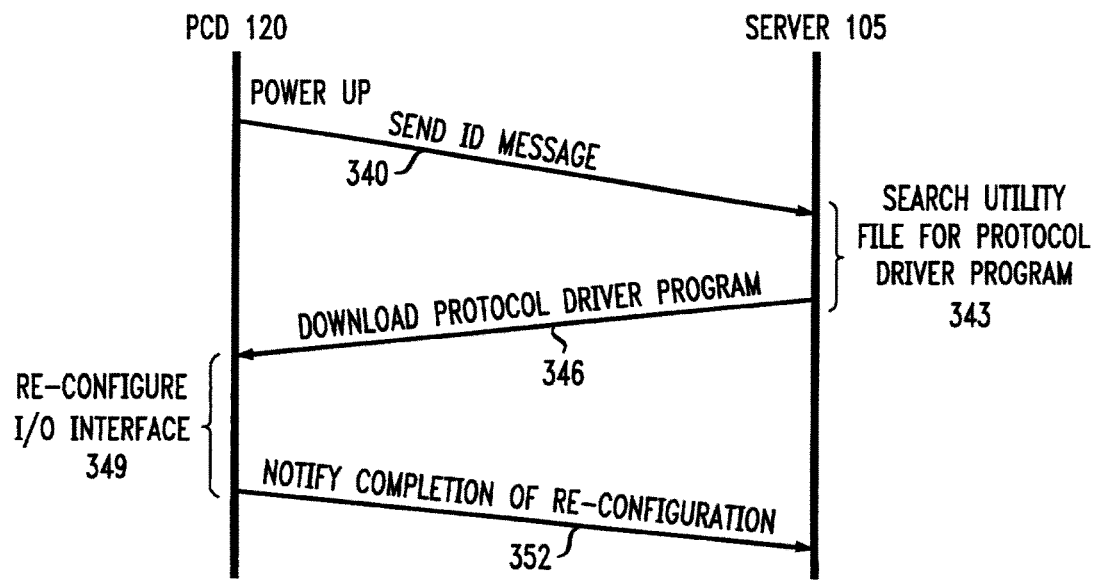
FIG. 6 illustrates a sequence of events after a mobile device is turned on to communicate with the server of FIG. 1.

FIG. 6 illustrates a sequence of events when a mobile device, e.g., PCD 120 in this instance, communicates with server 105 after PCD 120 is turned on. Specifically, on initial power up, PCD 120 sends at a basic rate an identification (ID) message in a common wireless messaging format, which identifies its mobile device type and model to server 105, as indicated at step 340. Server 105 processes the received ID message, and searches file 135 for the latest protocol driver program corresponding to the identified PCD 120, as indicated at step 343. Server 105 at step 346 downloads the latest driver program to PCD 120. At step 349 PCD 120 re-configures its input/output (I/O) interface in accordance with the driver program. PCD 120 then notifies server 105 of the completion of its re-configuration, as indicated at step 352. Such notification is sent to server 105 in the format and at the rate pursuant to the new protocol specified by the driver program. Upon receiving such a notification, server 105 is ready to communicate with PCD 120 using the new protocol.

Figure 7:
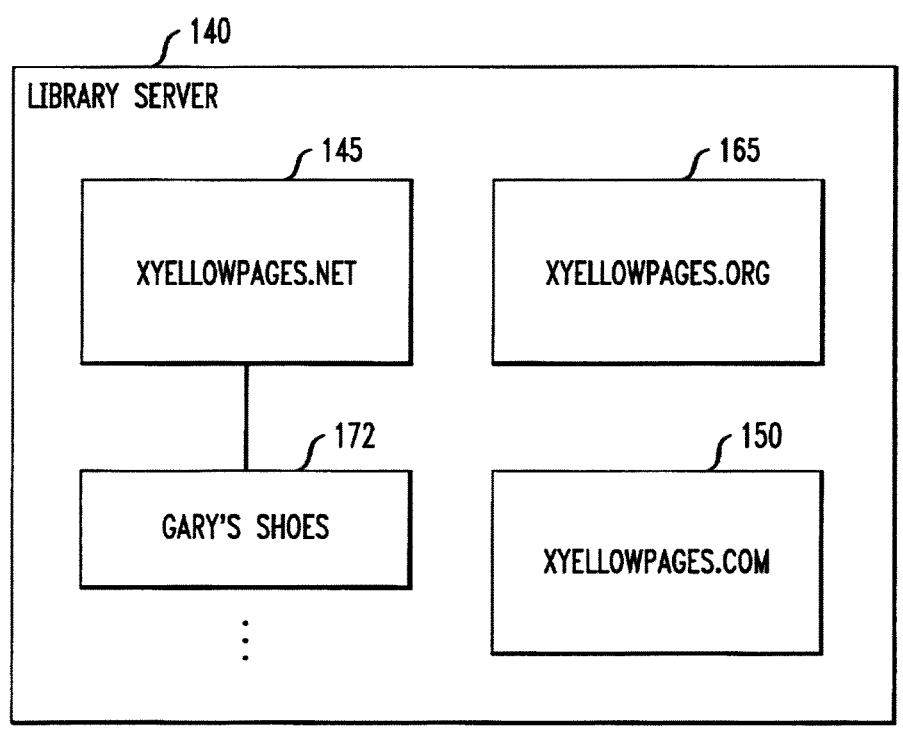
FIG. 7 illustrates a database of a library server in accordance with the invention.

As mentioned before, server 105 may search other library servers connected to Internet 170 for relevant information items. One such library server, denoted 140, is shown in FIG. 7. In this instance, the database in server 140 is organized and presented in multiple levels identified by top-level domains (TLD) in accordance with the Internet Domain Name System (DNS). For example, information items in such a database are organized in the "dot org," "dot net," and "dot com" domains. It would be appreciated that as the number of TLD names increases, the data organization in server 140 can be easily expanded to include the added TLD names.

In this illustrative embodiment, the "dot net" domain, e.g., Xyellowpages.net 145, includes links to the sites of a network of registered businesses. The site of each registered business, e.g., Gary's Shoes site 172, is listed under Xyellowpages.net 145 and can be accessed via a hyperlink.

Figure 8:
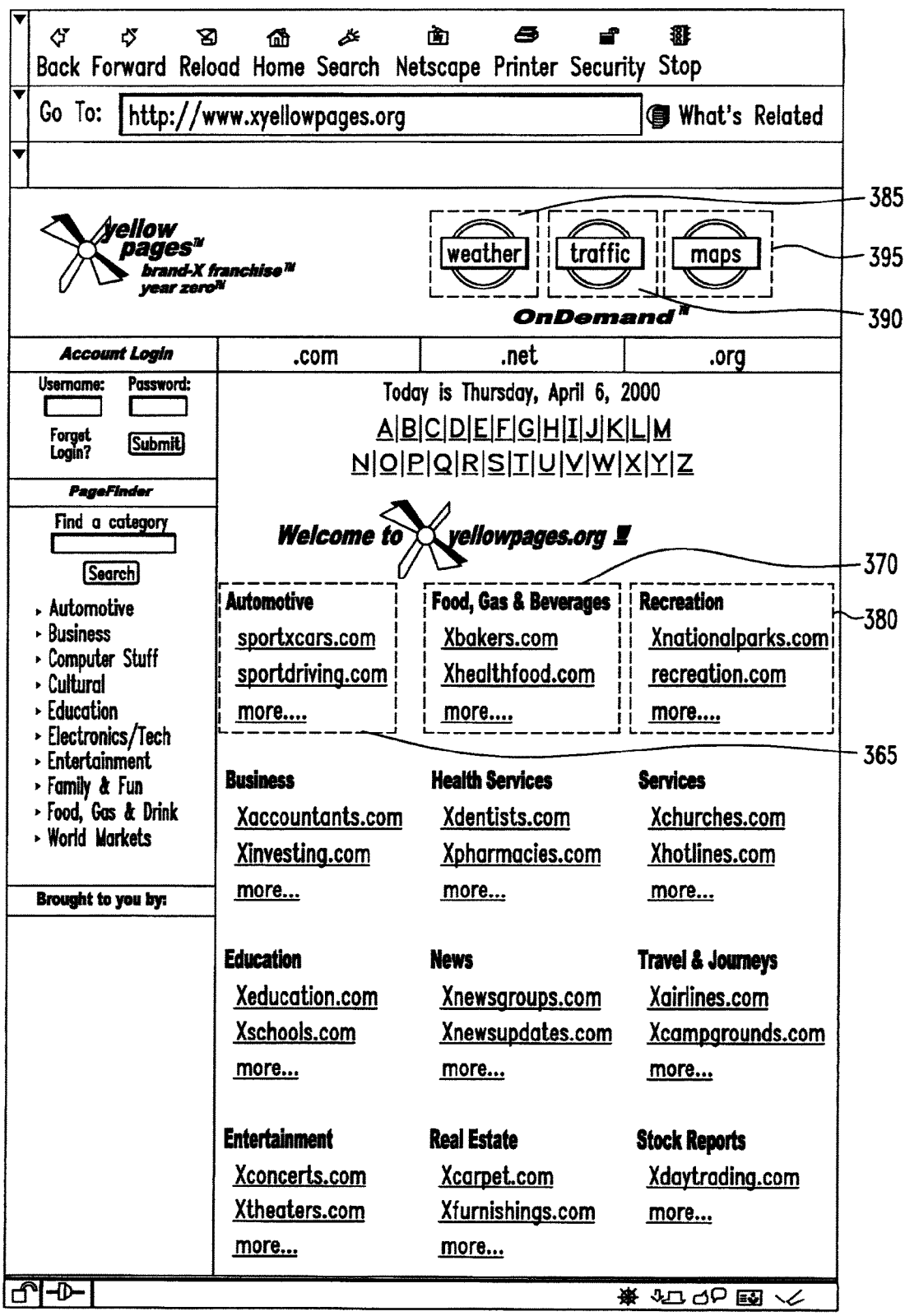
FIG. 8 illustrates a directory page containing categories of registered businesses in accordance with the invention.

To provide ease of finding related businesses and Internet sites, Xyellowpages.org 165 collates registered business sites into categories. The categories may include, e.g., entertainment, financial services, medical services, recreation, travel, etc. FIG. 8 illustrates an exemplary page listing business categories under Xyellowpage.org 165 that may be displayed on PCD 120. In this illustrative example, Xyellowpage.org groups related business information into specified functional categories. For example, Automotive category 365 includes all businesses related to automotive products; Food, Gas & Beverages category 370 includes all businesses related to food, gas and beverages; and Recreation category 380 includes all registered businesses related to recreation. As would be appreciated, businesses listed on xyellowpages.org 165 may be included in more than one category.

Further illustrated are icons keys for exemplary functions of weather 385, traffic 390 and maps 395. These keys enable the user to directly access these functions to obtain current weather and traffic conditions and maps. These keys direct server 105 to retrieve the corresponding information and present it to the user.

Referring back to FIG. 7, the "dot com" domain, e.g., Xyellowpages.com 150, includes a collection of pages describing any businesses having a TLD as the "dot com."

Figure 9:
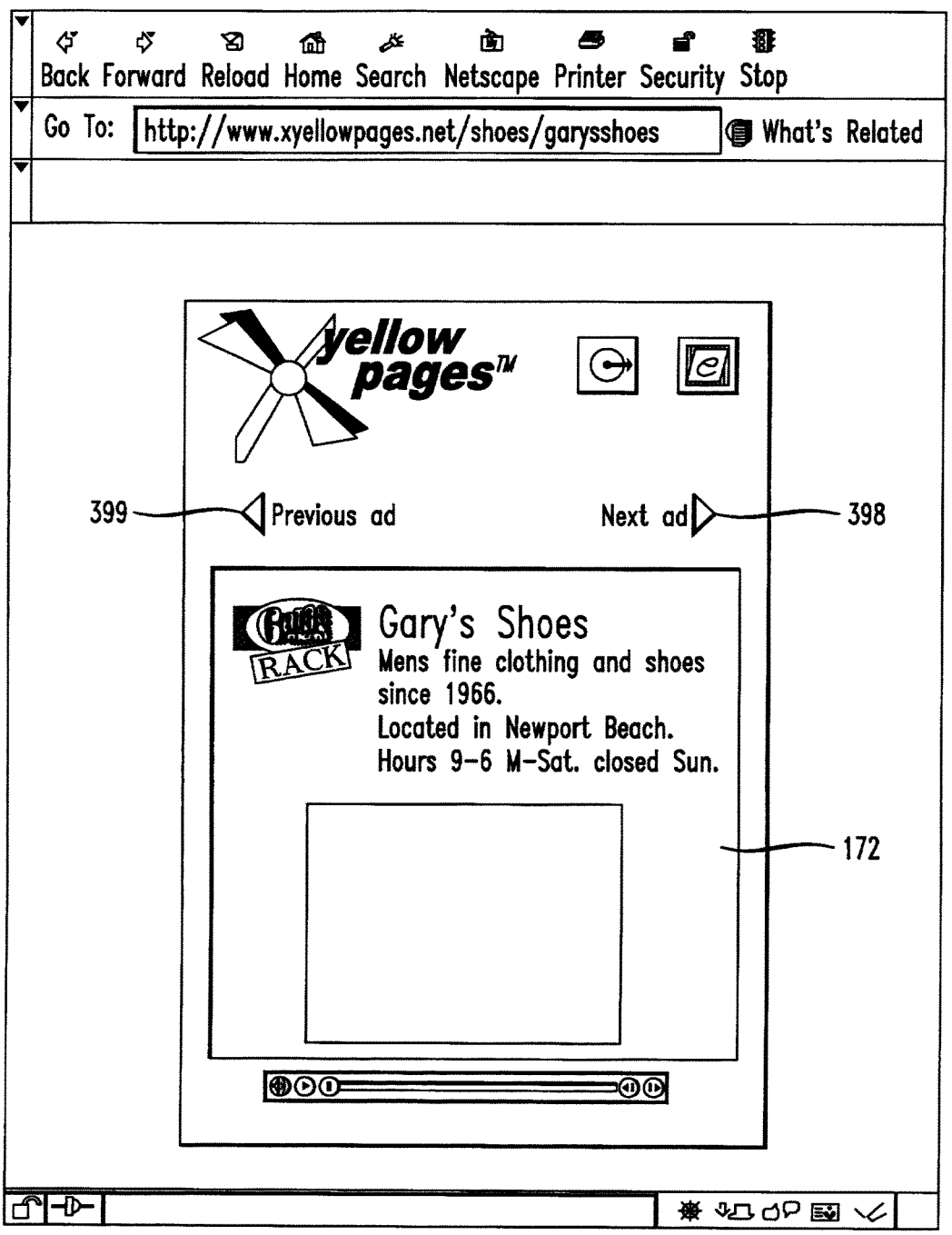
FIG. 9 illustrates an exemplary display of a registered business.

FIG. 9 illustrates a site advertising a selected registered business, e.g., Gary's Shoes site 172, which may be accessed from Xyellowpages.org 165 under the category "Shoes." It should be noted that this site may also be accessed via a hyperlink under Xyellowpages.net 141 as mentioned before. As shown in FIG. 9, site 172 includes contact information for the Gary's Shoes business. In addition, site 172 may contain hyperlinks for accessing more detailed information concerning the business. In this example, other businesses registered under the "Shoes" category may be quickly accessed by clicking the Next Ad arrow 398 or Previous Ad arrow 399. Advantageously, using arrow 398 and arrow 399, a user need not return to the page of FIG. 8 to access information items of other businesses within the "Shoes" category as would be in prior art where the "drill down" approach is embraced.

Thus, through server 105, a user may collect information items that have been learned or acquired, which may be needed in the future. Even more detailed knowledge of an acquired information item may be obtained by server 105 accessing searchable libraries. Thus, once an information item is learned or acquired, a user may retrieve not only the original information item, but also additional information concerning the original information item. The retrieved information items may be stored in one or more user profiles.

For example, a user may want to locate a particular business or service because there is a preference for the desired type of business or service or there may be a prearranged account with the desired business or service. The name of the desired business or service can be entered or retrieved from the stored information and a library search can be initiated to learn the locations of the desired business or service in a general area. When the locations of the desired businesses or services are known, then the distance, and direction, from the current location to the desired stations can be determined. Hence, the user profiles concerning selected information item are increased and the knowledge learned is used to confidently plan a route to a desired business while bypassing other undesired business that provide the same goods or services. The results of the searched libraries may also be stored into one or more selective user profiles.

Figure 10:
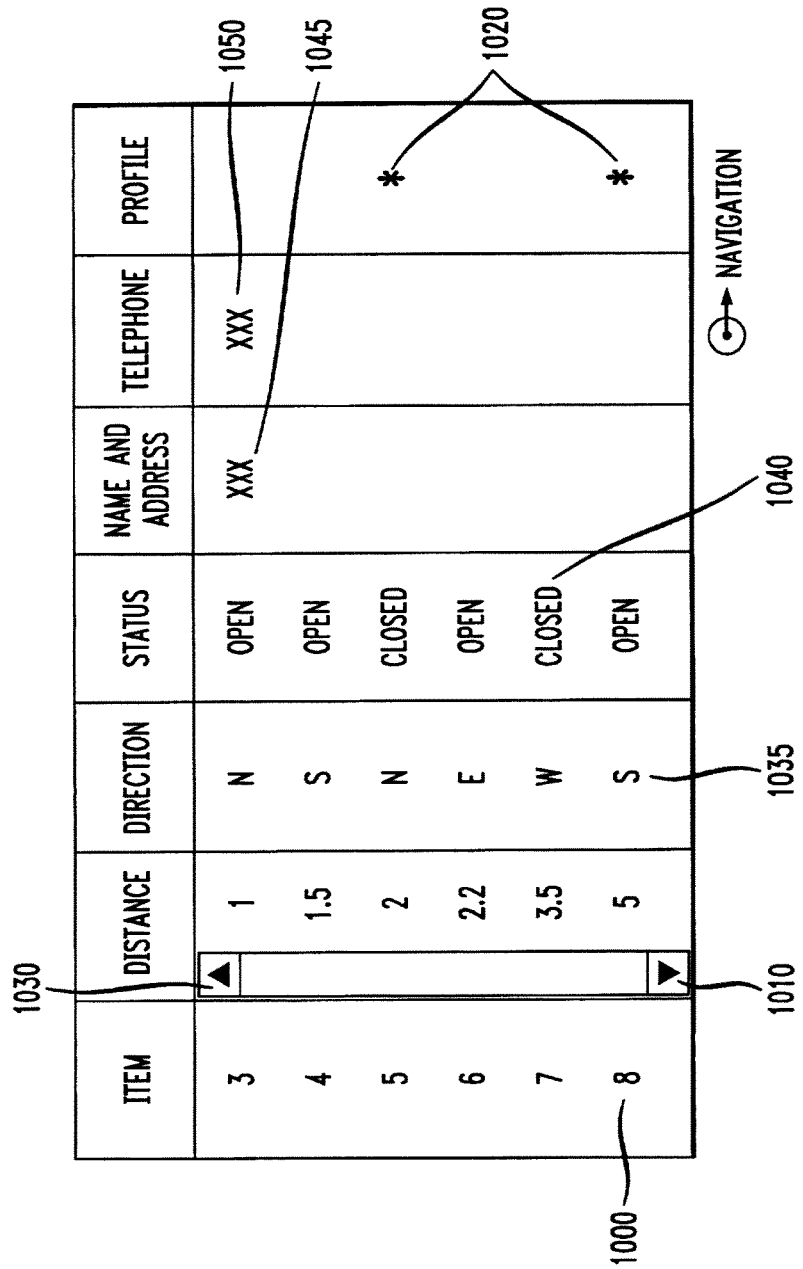
FIG. 10 illustrates a display containing navigation information in accordance with the invention.

For example, a user may use PCD 120 to request server 105 to provide information items concerning the location of service facilities, e.g., gas stations, within a given area while the user is in business. In response, server 105 searches libraries of registered businesses, e.g. Xyellowpages.org 165, other libraries connected to Internet 170, and the user business profile, e.g., business profile 220, for the gas stations. FIG. 10 illustrates the results of such a search which are presented to the user on the touch-screen display of PCD 120. The search results which are numerically indexed in column 1000 are sorted by distance from the user's current position. Such a current position may be determined using the aforementioned GPS device in PCD 120 and communicated to server 105 as part of the search request. It would be appreciated that the list may be sorted on other parameters such as status or direction, etc. by touching the corresponding header identifier on the screen using, say, a stylus. For example, when the header identifier STATUS is selected, the gas stations with the "open" status may be displayed ahead of the stations with the "closed" status.

As shown in FIG. 10, the directions, statuses, names and addresses, and telephone numbers of the selected gas stations are listed in columns 1035, 1040, 1045 and 1050, respectively. Indicators 1020 are also displayed, indicating those gas stations which also satisfy the user business profile in this instance. Arrows 1030 and 1010 indicate that there are non-viewable listed information items and these arrows allow the user to scroll the displayed list to display the non-viewable information items. The user, having information on the distance, direction and status of the gas stations, may confidently plan the route to the selected station.

In an alternative embodiment, based on the table of FIG. 10, server 105 provides a map on the display of PCD 120, with indications of the listed gas stations and the current route that the user is traversing, and may also suggest a route to any such gas station selected by the user, which entails minimal diversion from the user's current route.

In another alternative embodiment, server 105 may further determine the status of a selected gas station based on the estimated time of arrival at the selected gas station. The estimated time of arrival may be determined based on the user's current route, speed and position. In this embodiment, server 105 may determine that the gas station the user has selected based on current information may no longer be open at the time of arrival. Server 105 may warn the user of this change in status.

In yet another alternative embodiment, server 105 may track the position of the user and dynamically update traffic and weather conditions. In this embodiment, as a user traverses a route, server 105 may warn the user of changes in traffic patterns and weather conditions.

It should be noted at this point that the user may provide to server 105 the names of facilities, such as restaurants, gas stations, shopping malls, department stores, etc., which are encountered or observed along a route. Server 105 may then correlate the user entered information items with at least one list of restaurants, gas stations, service facilities, etc., to determine more specific information on the user entered information item. The more specific information on the entered restaurant, gas station, shopping mall or department store may then be collected and collated into an elected user profile.

The user may also save the sources of information items of interest using bookmarks for repeatedly accessing such sources. Server 105 may record where, and in which files, information may be found within searched libraries. For example, universal resource locators (URLs) for accessing web pages may be bookmarked under a selected user profile. The user may then recall information collected without re-entering the address sequence.

In accordance with another aspect of the invention, server 105 also provides a central location for messages that are received or transmitted by a user. Messages such as e-mail messages and audio messages received by a user may be stored on server 105 to simplify the message retrieval process. For example, centralization of e-mail messages is advantageous as it simplifies the management of e-mail messages of multiple Internet service provider (ISP) sites with which the user is registered. As can be appreciated, a user may have multiple e-mail addresses because the user may have personal e-mail addresses with one or more ISPs at a home location and an additional e-mail address with at least one ISP at a work or a business location. Further, many Internet services provide free e-mail service simply by registering for their service. These Internet services use their own e-mail address to provide updates to news or chat groups the user has expressed an interest. Hence, the user must access each ISP or Internet service independently to retrieve e-mail messages. When an ISP requires proprietary software to access the ISP or to process e-mail message, the user's retrieval of e-mail messages is limited to those times when the user is logged onto the mail serve aged by the ISP. The traditional way of retrieving e-mail messages by accessing mail servers of different ISPs and Internet services is both time-consuming and cumbersome.

In accordance with another aspect of the invention, server 105 centralizes the e-mail retrieval process. Each ISP or Internet service receiving e-mail messages addressed to the user forwards the received e-mail message to a single e-mail address assigned to the user by server 105. Server 105 upon receiving a forwarded e-mail message stores the message according to a message source identifier and criteria established by the user. Server 105, after storing the message, provides a notification of the received message to the user. The user may then selectively view e-mail messages from multiple ISP sources without accessing each ISP or Internet service mail server. Furthermore, server 105 stores the received e-mail messages according to the user profiles. Thus, messages related to vacation resorts are stored in the user vacation profile, and message related to business are stored in the user business profile. The vacation e-mail messages may be read at leisure while the business e-mail messages may be read immediately. Thus, by centralizing the e-mail retrieval process in server 105, the received e-mail messages can be pre-sorted and organized in accordance with the user's selection criteria.

As is well known, an e-mail message typically includes a source identifier indicating the source of the e-mail message. A source identifier may include an e-mail address of the sender. A user may also provide a keyword to social contacts and other keywords to business contacts for incorporation in the "Subject" portion of an e-mail message. Such keywords may be used in combination of the source identification tags for prioritizing the messages received.

Figure 11:
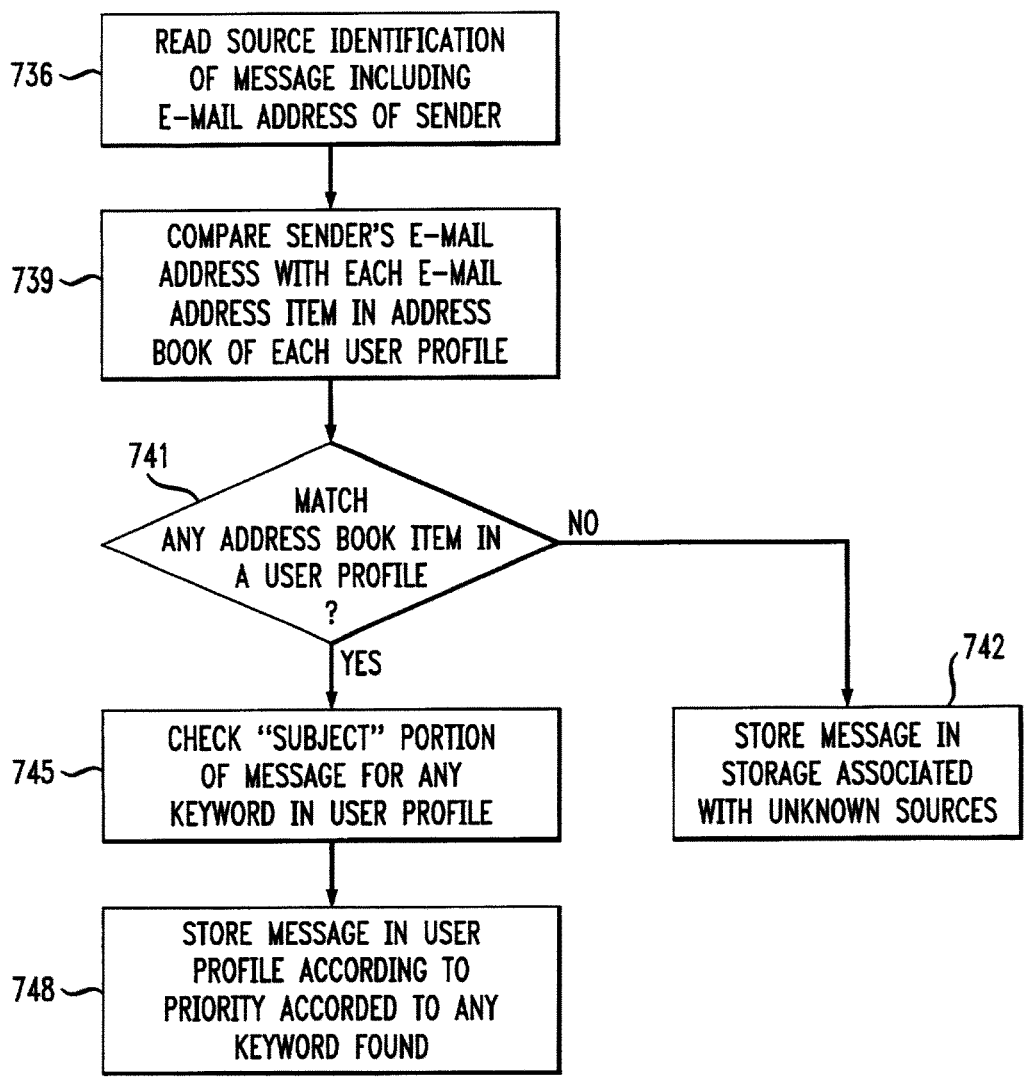
FIG. 11 is a flow chart depicting the processing of e-mail messages to the user in accordance with the invention.

FIG. 11 illustrates a flow chart depicting the processing by processor 107 of e-mail messages to the user forwarded by ISPs and Internet services to server 105. At step 736, processor 107 reads the source identifier of a received e-mail message which includes the e-mail address of the sender. Processor 107 at step 739 compares the sender's e-mail address with each e-mail address item in the address book of each of the user profiles, and at step 741 determines whether the comparison results in any match. If the sender's e-mail address does not match any address book item of any of the user's profiles, the subject message may be regarded as an unsolicited message and processor 107 at step 742 stores it in a storage area associated with unknown sources.

In this instance, the user provides keywords (not shown) in each profile for prioritizing the received messages having known sources. Each keyword is accorded a different priority. The e-mail message sender may include one of the keywords, given to him/her by the user earlier, in the "Subject" portion of the message. Thus, in this instance, if the e-mail address of the sender of the subject e-mail matches an item in the address book of a user profile (e.g., business profile 210), processor 107 checks the "Subject" portion of the message for any keyword provided in that user profile, as indicated at step 745. Processor 107 at step 748 stores the message in such a user profile (e.g., in storage 227 in profile 210) according to the priority accorded to any keyword found. The received e-mail messages in a profile are organized with messages having a higher priority are presented first. Apparently, a received message having no keyword in its "Subject" is presented after the ones having a keyword therein.

Processor 107 concludes the e-mail message processing by notifying the user of the receipt of the message, with the identity of the associated profile and priority. Through, say, PCD 120 the user, upon receiving the notification, may elect to read the message immediately or at a later time. Further, the form of notification may be based on the priority of the message. For example, the notification of any received message of the highest priority is immediate with a description of the message shown on the screen of PCD 120. Such a notification may interrupt any on-going communications being conducted by PCD 120. The notification of a less important message may cause PCD 120 to turn on an audible alarm or a message light.

It should be noted that the above-described technique for processing e-mail messages may similarly be applied to the processing of any types of message, including voice messages where, for example, PCD 120 is unavailable to accept a telephone call. In that case, the call is forwarded, through a call-forwarding pre-arrangement, to server 105 where processor 107 requests the caller to leave a voice message. The source of any such voice message may be identified by a caller ID indicating, among others, the caller's telephone number. In addition, the caller may utter a keyword in the beginning of the voice message indicating its priority, thereby facilitating the search by processor 107 for the keyword in sorting messages.

Figure 12:
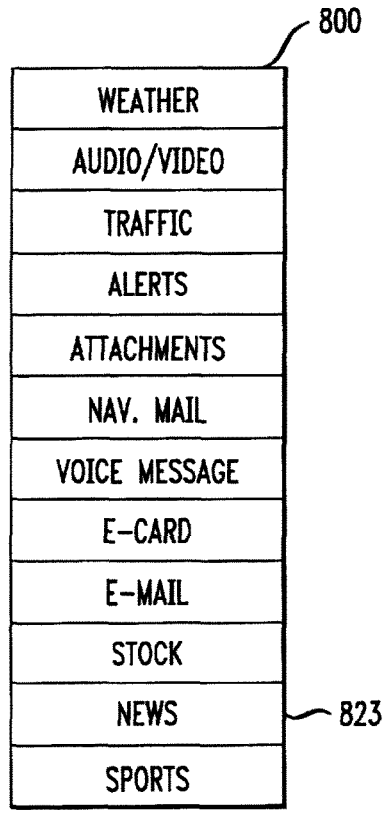
FIG. 12 illustrates a dropped-down menu administered by an event manager in the mobile device in accordance with the invention.

To help present on PCD 120 information items downloaded from server 105, an event manager is used in PCD 120. The event manager enables a user to selectively receive and sort requested or transmitted information items, and it organizes such information items in categories selectable through use of drop-down menus. FIG. 12 illustrates one such drop-down menu (denoted 800) which is displayed on PCD 120 for user selection. As would be appreciated, the categories in menu 800 may be pre-set or created by the user, which may relate to the files of the user profiles in server 105. It should be noted that the contents of the personal profile are most likely different than the contents of the business profile, even when they have identically-named files therein. For example, Current Events file 223 of business profile 220 contains business-related news items while Current Events file 216 of personal profile 210 contains general news items. Thus, in this instance a selection of News category 823 in menu 800 affords further user selections of business-related news and general news sub-categories.

Figure 13:
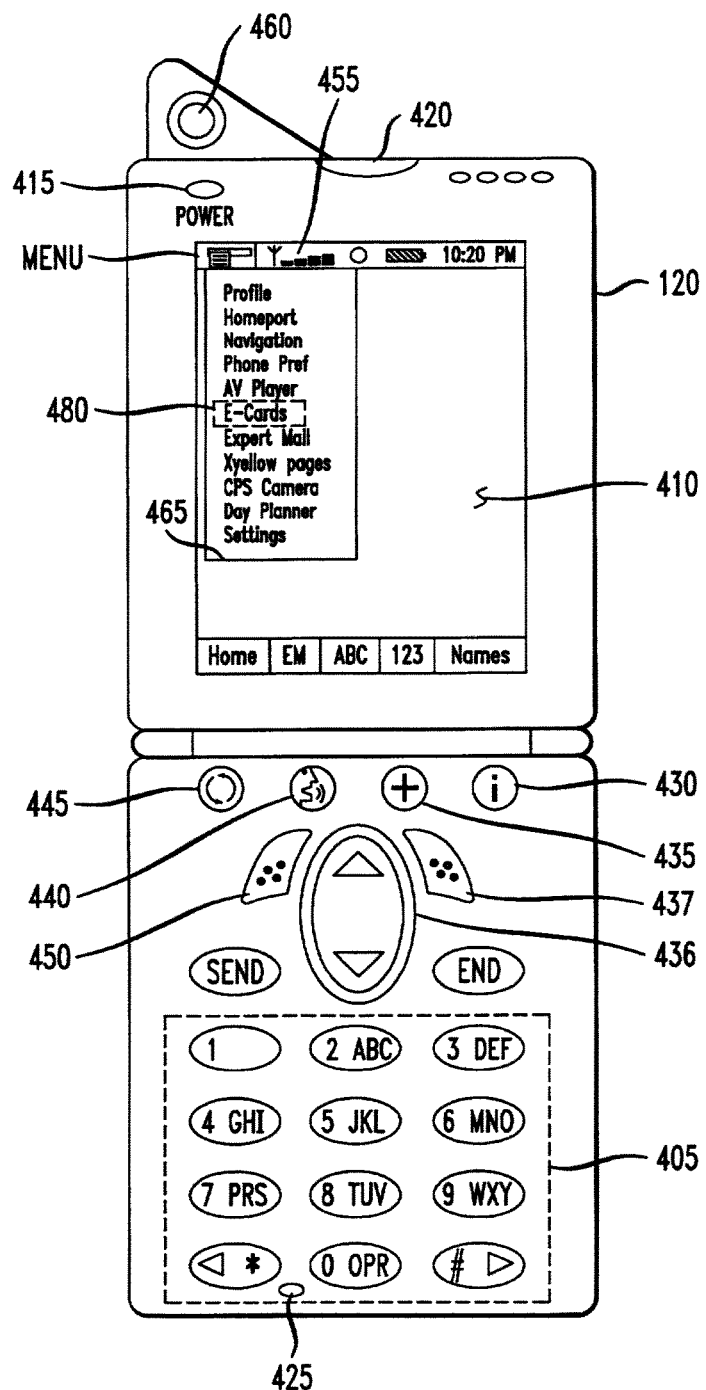
FIG. 13 illustrates a personal communication device (PCD) which is a mobile device in accordance with the invention.

FIG. 13 illustrates PCD 120 which includes keypad 405, display screen 410, microphone 425, speaker 420, scroll keys 436, and entry keys 437 and 450. Further illustrated are dedicated functional keys, labeled pictorially with an "i" 430, a "cross" 435, a facial profile 440 and circular arrows 445. These keys are descriptive which represent Help, Emergency, Voice on/off and Repeat functions, respectively. These dedicated keys may be physical buttons that engage electrical contacts when depressed. Alternatively, they may be displayed icons or "soft" keys selectable by touching them on screen 410.

Keypad 405 allows a user to enter alphanumeric characters to enter data or respond to requests. Display screen 410 is used to display textual and graphic information and operates to allow data entry or process selection. Display 410 may allow data entry or process selection by using the illustrated drop down menu 465, for example, or by the selection of icons (not shown), which are representative of a processing function or category, or by writing, or printing, alphanumeric characters on the display face (not shown). Microphone 425 and speaker 420 are used to transmit and receive audio information, such as speech or music. Process selection may also be performed by issuing a verbal command entered through microphone 425.

Scroll keys 436 are used to scroll through a list of information items, such as the illustrated functional categories in pull-down menu 465. A selected information item may then be activated, to perform a process, or to be viewed, by depressing left key 450, for example. In this instance, electronic information card (E-card) category 480 is selected (indicated by dashed-line enclosure) in drop-down menu 465. Information items associated with E-card category 480 may then be viewed by depressing left entry key 450, which are described below. Information items associated with a category may also be selected by touching the category on screen 410 using a pointing device. A pointing device may be a pencil, a pen, a stylus or an infrared, or visible light, laser pointer. Further still, the information items of a selected category may also be viewed by maintaining contact with a displayed icon, or word, that represents the category, for an extended time, or by double-tapping the displayed icon, or word, within a finite time. The selection of categories may also be performed by verbally reciting the category name into microphone 425 and the information items within the selected category may also be viewed by verbally reciting the information item name.

FIG. 13 further illustrates right entry button 437, which may be pressed to view properties of a category selected. For example, the properties may provide data concerning the number of information items in a category, the number of unread information items in the category, or when the last information item was added to the category, etc.

Help key 430 allows access to information concerning quick starting procedures, e.g., an owner's manual, a how-to video demonstration, and a voice script that is used to operate telephone aspects of PCD 120. These help tips provide sufficient information for the user to operate the device. This information provides just enough information, i.e., just-in-time-learning, to enable the user to operate the device. Emergency key 435 provides access to emergency numbers and information that can transmitted to a parties named in an emergency file in a personal profile. The emergency file may be included in medical records 215 of personal profile 210 illustrated in FIG. 4. Activation of Emergency key 435 causes server 105 to contact the named emergency contact people. Further, medical records information items such as medical history, current medication history, and medications to be avoided may also be transmitted. Voice on/off key 440 provides the user with the capability to mute messages that may be audibly expressed by PCD 120. This muting function is useful to prevent audio messages from interfering with a conversation that is in progress. Repeat key 445 provides the user with the capability of repeating previous messages or actions that were performed.

Digital camera 460 is also included in PCD 120. Camera 460 is capable of capturing an image that can then be stored locally or transmitted to server 105 for storage in a selected user profile, e.g., vacation profile, or for transmission over Internet 170 to another party. Camera 460 may also transmit digital images synchronized with audio data to provide real-time audio/visual data or may transmit audio data sequentially with digital images. Images from camera 460 may further be integrated with additional information items, such as real-time clock or GPS time/positional data to provide time/location tagging of an image. Such time/position tagging may be used to authenticate the image.

Figure 14:
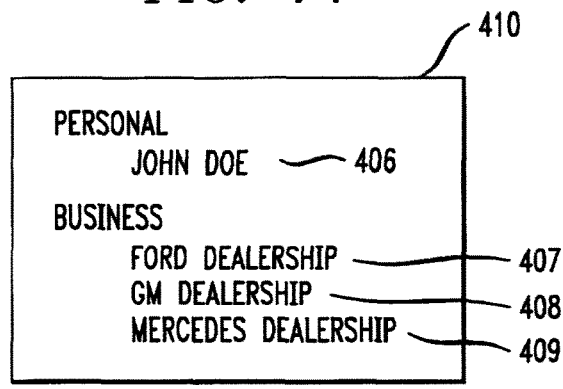
FIG. 14 illustrates a display of selectable options on the PCD of FIG. 13.

Continuing the above example, once E-card category 480 is selected, PCD 120 displays on screen 410 further options for selection. FIG. 14 illustrates such options. In this instance, information items associated with category 480 are divided into personal and business sub-categories, which correspond to personal and business profiles in server 105. As shown in FIG. 14, included under the personal sub-category is option 406, entitled "John Doe," the name of the user in this instance. In addition, included under the business sub-category are options 407, 408 and 409, entitled "Ford Dealership," "GM Dealership" and "Mercedes Dealership," respectively.

Figure 15A:
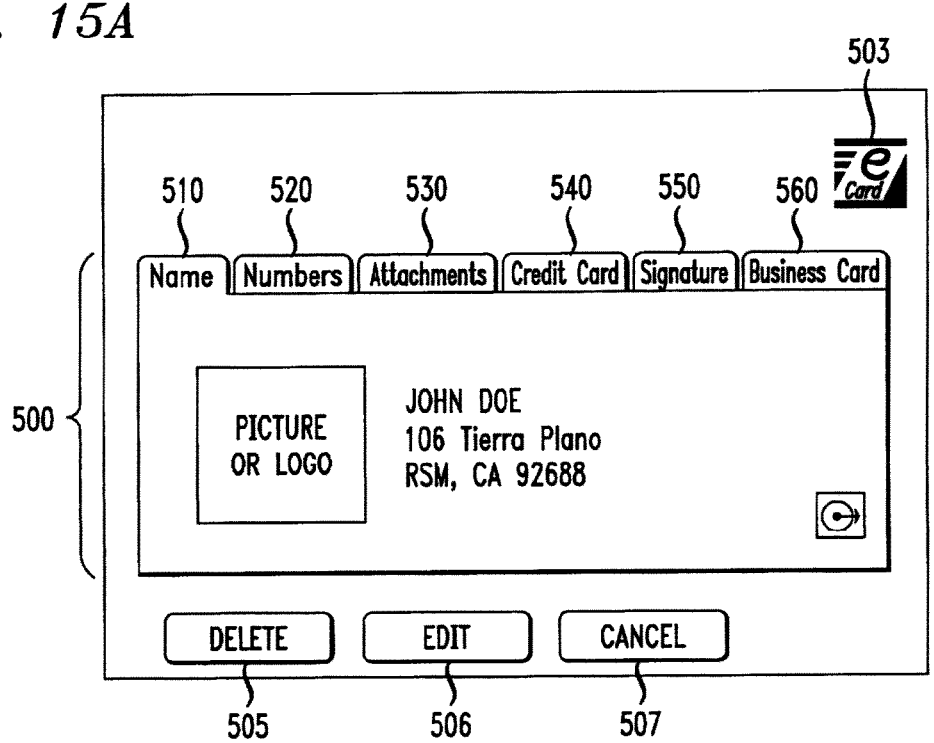
FIGS. 15A-15F jointly illustrate a personal electronic information card (E-card) in accordance with the invention.

In this example, the user selects John Doe option 406. In response, PCD 120 displays on screen 410 information item 500 which represents a personal E-card of John Doe. FIG. 15A illustrates such a display screen including E-card 500. This E-card contains textual, audio and/or graphic information items pertaining to John Doe, which are sorted and organized in tabbed records. Illustratively, these tabbed records include Name 510, Numbers 520, Attachments 530, Credit Card 540, Signature 550 and Business Card 560. E-card 500 is shown by default with Name record 510 superimposed on other records. However, the tabs for these other records are displayed for selection. As shown in FIG. 15A, Name record 510 contains identification information concerning the user, including a picture or logo identifying the user.

Further illustrated in FIG. 15A are Delete key 505, Edit key 506 and Cancel key 507. Delete key 505 allows the user to delete information items in E-card 500 from the user profile in server 105. Edit key 506 enables the user to edit selected entries in E-card 500. Cancel key 507 allows the user to end the viewing of E-card 500.

Figure 15B:
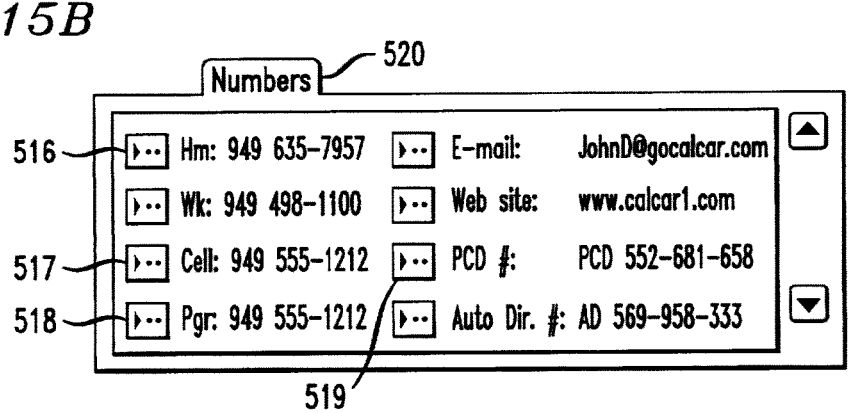

FIG. 15B illustrates Numbers record 520 containing contact information concerning the user. As shown in FIG. 15B, record 520 includes the user's telephone numbers for home (hm) and business, e-mail address, PCD address, etc. In addition, information items in record 520 may be selected for transmission to another party. For example, by checking boxes 516, 517, 518 and 519, the user may transmit the corresponding information items by selecting icon 503 in FIG. 15A which represents a send key in this instance. The receiving party would then receive the user's home, cellular, pager and PCD numbers. The format of the received information items would correspond to a comparable E-card format on the receiving party's PCD. Hence, the receiving party is relieved of the burden of re-entering the received information items into a different device or organization structure. Similarly, the user may select some or all the items on each E-card record for transmission to another party.

Figure 15C:
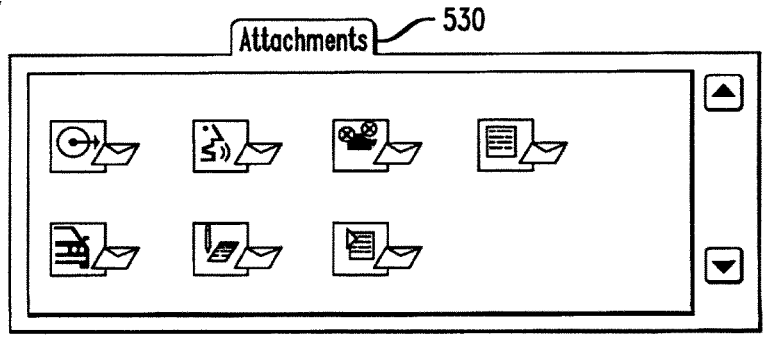

FIG. 15C illustrates Attachments record 530 having displayed icons therein which represent information items. Record 530 may include, e.g., textual instructions and graphic images of directions from a source location to a destination or may include notes for personal use. Information items in record 530 may be transmitted to another party by selecting the corresponding displayed icons, followed by selection of icon 503 to send the information item. As would be appreciated, a user may select information items on each record of E-card 500 and transmit all of the selected information items using a single selection or click of icon 503.

Figure 15D:
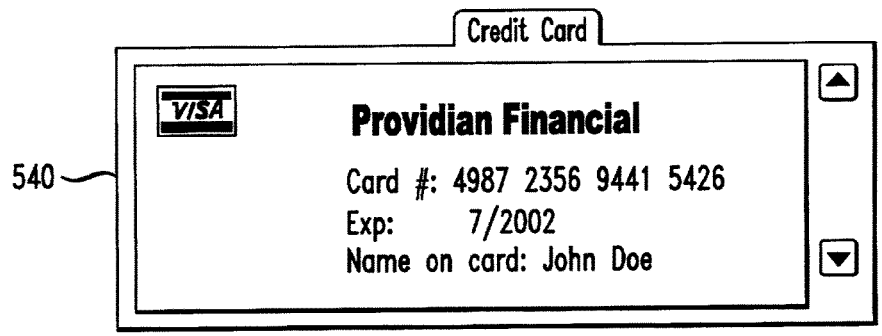

FIG. 15D illustrates Credit Card record 540 containing the user's credit card information. Using a E-card to record the user credit card information is advantageous as it allows the user to electronically pay for purchases without revealing important personal financial data such as the credit card number at the point of sale. The methodology of conducting a secure transaction using record 540 is fully described below. E-card 500 may further record the transaction date and amount and the merchant's name after the transaction is conducted. This recordation of the purchase is advantageous in tracking and reconciling expenses each month.

Figure 15E:
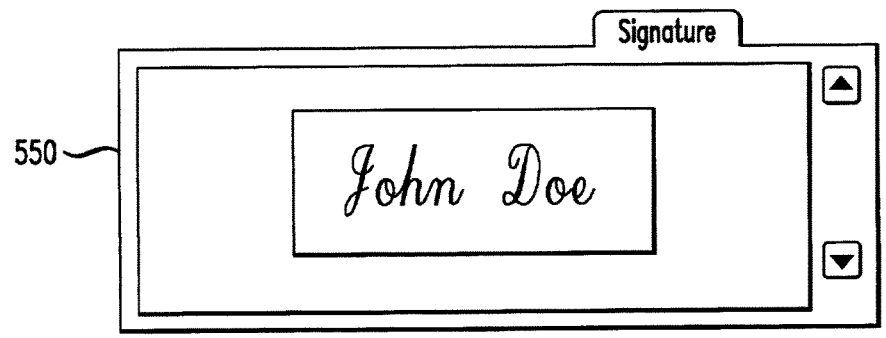

FIG. 15E illustrates Signature record 550 containing the user's digital signature, which may be used to digitally commit the user to contractual obligations. That is, the user's digital signature may be transmitted to a receiving party to obligate the user to terms and conditions of a contract to buy a car, a house, etc.

Figure 15F:
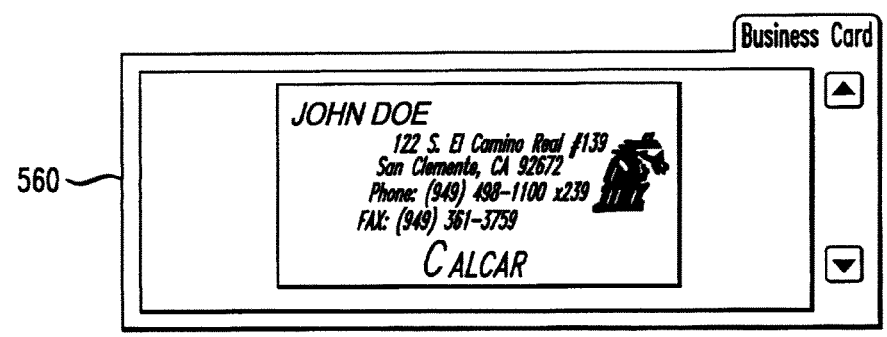

FIG. 15F illustrates Business Card record 560 including information items such as the user's business name, address, phone number, title, etc. which, like other information items, are transmissible to other parties.

Figure 16A:
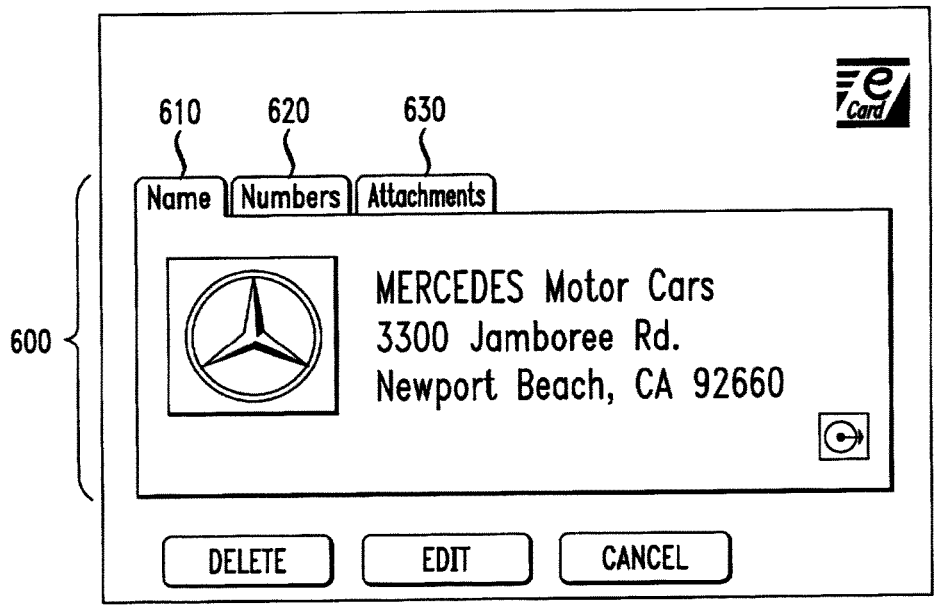
FIGS. 16A-16C jointly illustrate a business E-card in accordance with the invention.

FIG. 16A illustrates business E-card 600 concerning a Mercedes dealership. Similar to information items in E-card 500, information items in E-card 600 are sorted and organized tabbed records. As shown in FIG. 16A, these records include Name 610, Numbers 620, and Attachment 630. Name record 610 includes identification information concerning the Mercedes dealership, including the Mercedes logo.

Figure 16B:
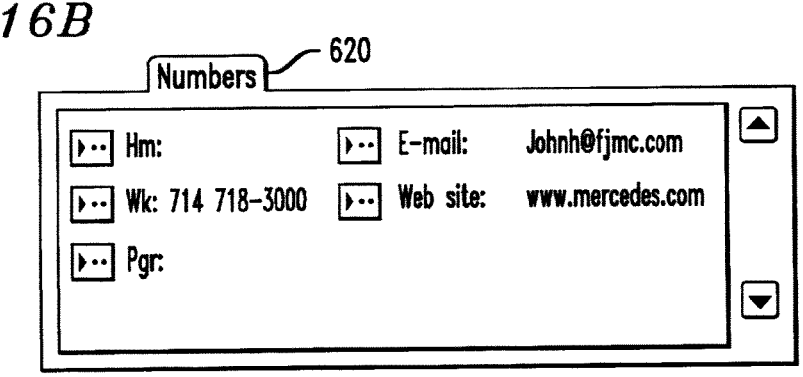

FIG. 16B illustrates Numbers record 620 providing contact information concerning the Mercedes dealership.

Figure 16C:
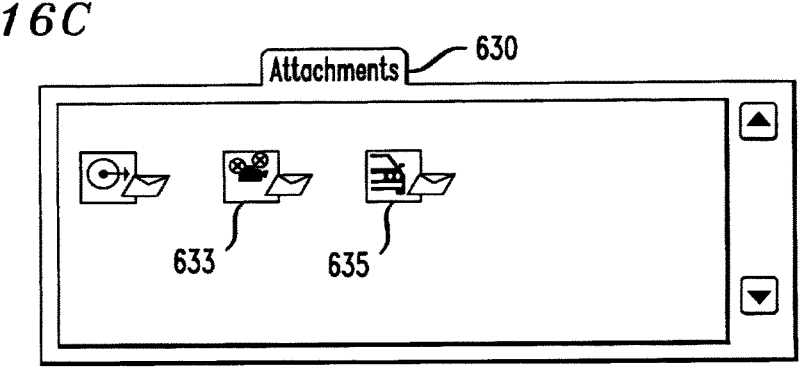

FIG. 16C illustrates Attachments record 630 including such attachments as video file 633 promoting the Mercedes dealership, and text and graphics file 635 describing the latest models of Mercedes vehicles.

Figure 17A:
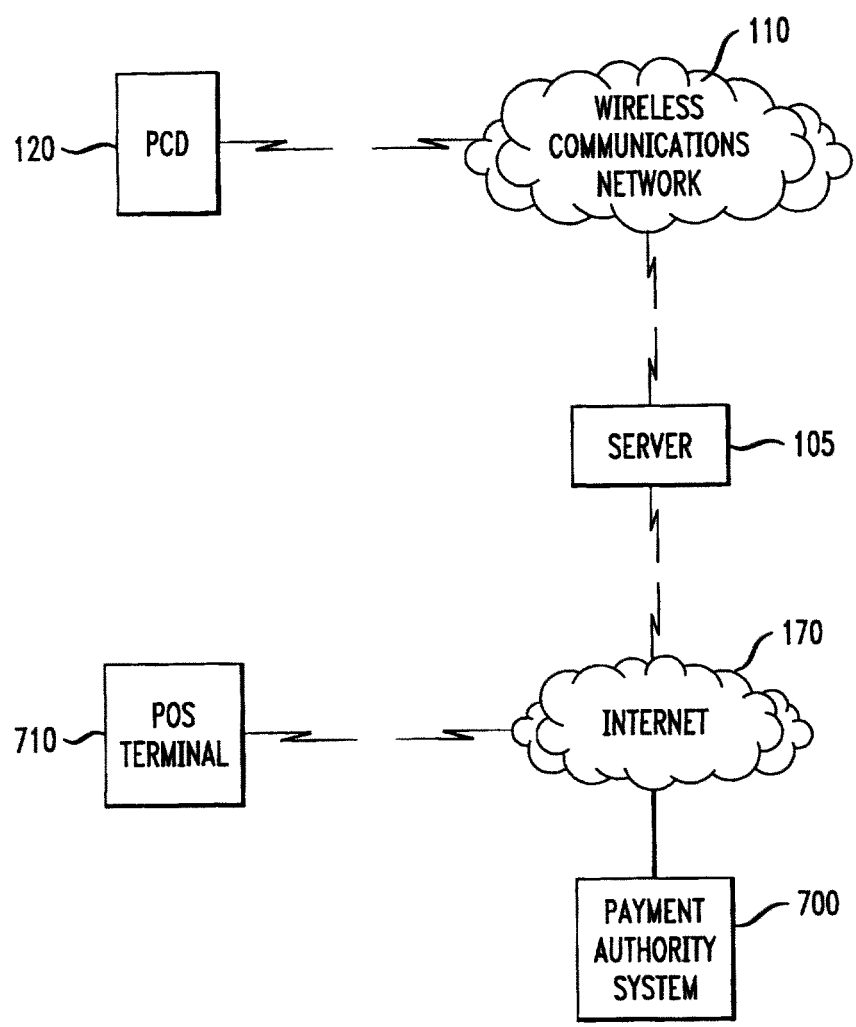
FIG. 17A illustrates an arrangement for conducting a credit card transaction using the PCD of FIG. 13.

The methodology of conducting a transaction using Credit Card record 540 will now be described. For example, referring to FIG. 17A, the user in this instance wants to pay by credit card for a purchase at point-of-sale (POS) terminal 710. The user uses PCD 120 to access Credit Card record 540. By selecting icon 503, a signal containing the information in record 540 is transmitted over wireless communications network 110 to server 105. In return, processor 107 in server 105 elicits from the user his/her personal identification number (PIN) to verify that he/she is the authorized credit card user. In addition, processor 107 elicits from the user the purchase amount, and a transaction identification (ID) number which is provided by POS terminal 710. Such a transaction ID number identifies, among others, POS terminal 710, the merchant (e.g., Gary's Shoes) and the purchase type (e.g., shoe purchase). Upon receiving the PIN, purchase amount and transaction ID number from PCD 120, processor 107 compares the received PIN with the PIN which is provided earlier by the user in a service registration and stored in personal profile 210. If the received PIN matches the stored PIN, processor 107 causes server 105 to transmit through a secure link over Internet 170 to payment authority system 700 a request for authorization of payment. Such a request includes the received credit card information, purchase amount and transaction ID number. Payment authority system 700 then processes the request. Based on the transaction ID number which, in part, identifies POS terminal 710, system 700 transmits to POS terminal 710 a message confirming or denying the payment of the purchase amount. At the same time, system 700 transmits a second message to server 105 for the user record. This second message indicates the payment confirmation or denial, and may contain information concerning date and time of the payment confirmation or denial, the purchase amount involved, and the identity of the merchant and purchase type derived by system 700 from the transaction ID number. Upon receiving such a second message, if the payment is confirmed, processor 107 stores a purchase confirmation record in personal profile 210. Otherwise, if the payment is denied, processor 107 stores a purchase denial record in profile 210. The user is informed of the payment confirmation or denial by the POS terminal 710, or by polling server 105 through PCD 120.

It should be noted that the above-described methodology is not limited to use of a PIN to verify the identity of the user. Other security measures may also be implemented which include use of digital camera 460 in PCD 120 to transmit an image of the user to server 105 for verification purposes. It will be appreciated that fingerprint images, retinal or iris scans may similarly be used.

In an alternative embodiment, for security reasons, server 105 maintains a POS database which provides the GPS coordinates identifying the location of each POS terminal, including terminal 710. Thus, in conducting the above purchase, processor 107 in server 105 may also request PCD 120 to provide the GPS coordinates identifying the current location of PCD 120. Such GPS coordinates are then provided by the aforementioned GPS device in PCD 120. Based on the above-described transaction ID number which in part identifies POS terminal 710, processor 107 searches the POS database for the GPS coordinates of terminal 710. Processor 107 determines the distance between PCD 120 and POS terminal 710. If such a distance exceeds a predetermined amount, processor 107 immediately terminates the processing of the transaction, assuming that the user conducts the purchase at the POS location and thus should not be away from POS terminal 710 for more than the predetermined distance. Still other security measures may be instituted using the Internet protocol (IP) address of server 105. In that case, payment authority system 700 may evaluate the IP address of server 105 transmitting the payment request and would not authorize payment if the request does not come from the IP address of server 105 associated with the user. The user's digital signature in Signature record 550 may be used in a similar manner. The digital signature may be authenticated based on the IP address of server 105 forwarding the digital signature. This authentication is advantageous as a digital signature that did not come from the IP address of a server associated with the user would not bind the user to the terms of a contract or sale.

In accordance with another aspect of the invention, server 105 also incorporates the GPS coordinates of POS terminal 710 in the purchase confirmation and denial records. Alternatively, the GPS coordinates of POS terminal 710 is translated to an actual location (e.g., the address) of the premises on which the purchase is conducted, and the actual location is made part of the purchase confirmation or denial record. Such translation may be achieved using a well known GPS database in server 105 or in another server to which server 105 has access. Thus, in this embodiment, when the user uses PCD 120 to poll server 105 for purchase confirmation records stored in server 105, server 105 returns to PCD 120 a PURCHASE CONFIRMATION RECORDS screen on display 410, which is illustrated in FIG. 17B. At this screen, the user is afforded options to review selected purchase confirmation records. For example, the user may specify at option 1725 the number of most recent records to review, thereby providing just-in-time information on the user's purchases. In this example, however, the user is interested in reviewing the records within a particular period. Thus, the user in this instance enters the start date of the period at option 1732 and the end date thereof at option 1735. As a result, the purchase confirmation records within the specified period are displayed in chronological order. For example, record 1741 is the first record on the start date, and record 1743 is the last record on the end date. Each record contains multiple fields. For example, record 1743 contains date field 1751 identifying the date of the purchase confirmation, merchant name and address field 1753 identifying the merchant and its address, purchase type field 1755 identifying the type of purchase, and transaction amount field 1757 identifying the transaction amount. In addition, at the end of the list of records, TOTAL field 1761 indicates the sum of the transaction amounts in the listed records. Advantageously, with the information in field 1761, the user can continually keep track of the expenses resulting from purchases.

Figure 18:
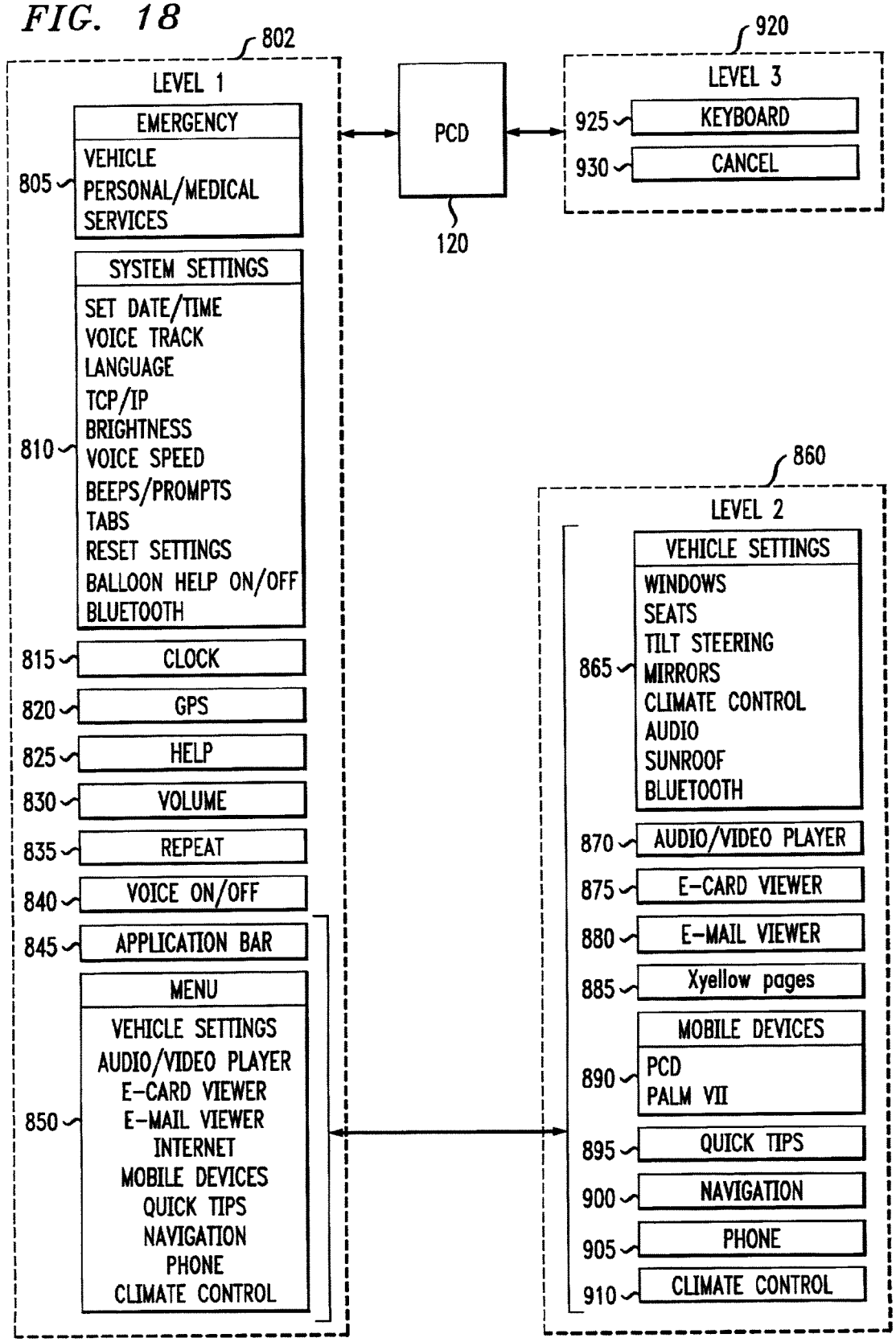
FIG. 18 illustrates a functional schematic of the PCD of FIG. 13.

FIG. 18 illustrates a functional schematic of PCD 120 when "docked" or connected to an automobile system to enhance its functionality. Such a connection may alternatively be a remote connection between PCD 120 and the automobile system relying on wireless or Bluetooth communications, for example. One such automobile system is described, e.g., in U.S. Pat. No. 6,009,355 ("the '355 patent") issued Dec. 28, 1999 to Obradovich et al., which is hereby incorporated by reference. As shown in FIG. 18, this functional schematic is divided into three levels. First level 802 includes processing of information items that are of importance to the user in real-time or near-real-time. For example, the first level functions include emergency function 805, System Settings function 810, Clock function 815, GPS function 820, Help function 825 (as activated by Help key 430), Volume control 830, Repeat operation 835 (as activated by Repeat key 445), Voice on/off 840 (as activated by Voice key 440), Application Bar 845 and Menu function 850 which require real-time or near-real-time operation. Second level 860 includes processing of information items which are of secondary importance to the user which, e.g., relates to operation of accessories. For example, the second level functions, which are managed by Application Bar 845 and Menu function 850, include Vehicle Settings function 865 comprising, e.g., window control, seat position control, mirror adjustment, etc., Audio/Video Player function 870, E-card Viewer 875, E-mail Viewer 880. Xyellowpages function 885, interfaces with Mobile Devices 890, Quick Tips function 895, Navigation function 900, Phone function 905 and Climate Control function 910. Third level 920 includes user interface functions such as Keyboard commands 925 and Cancel commands 930.

Figure 19:
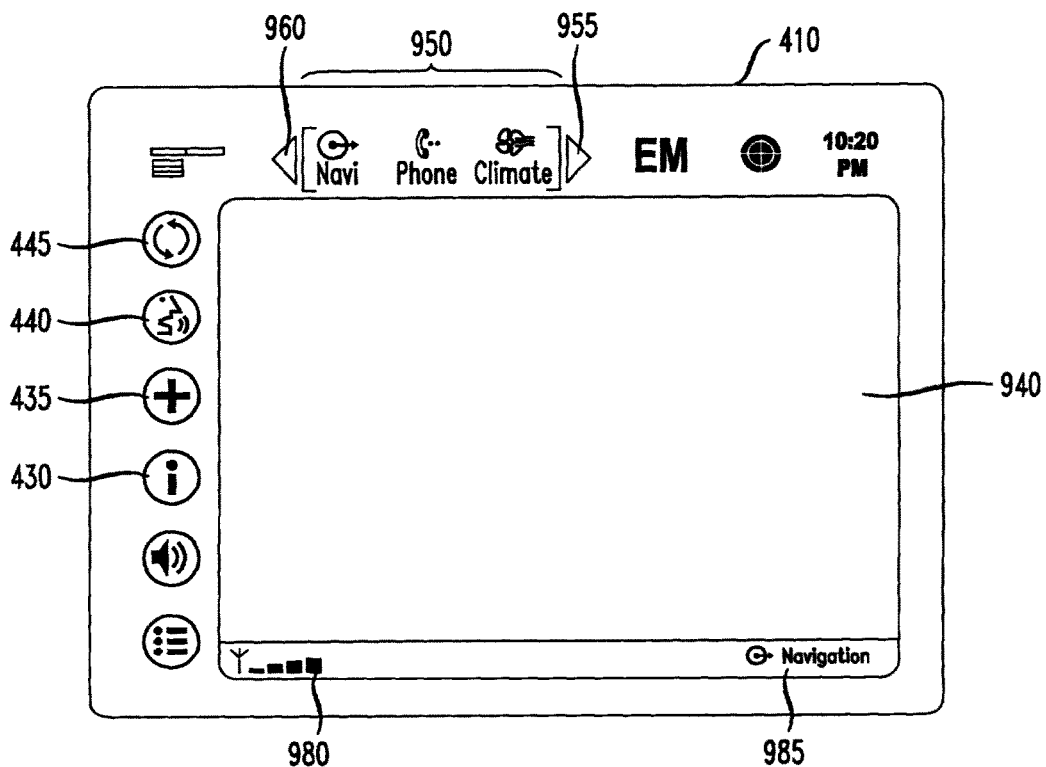
FIG. 19 illustrates a display arrangement of the PCD of FIG. 13.

FIG. 19 illustrates a second embodiment of display screen 410 of PCD 120 which is particularly advantageous when PCD 120 is connected to the aforementioned automobile system. In this embodiment, screen 410 provides display area 940, programmable displayed icon segment 950, and displayed icons including Help 430, Emergency 435, Voice on/off 440 and Repeat 445 which are described before. Display area 940 may also be used to input information items into PCD 120. Display area 940 operates to allow menu-driven or screen sensitive (touch-screen) input.

Segment 950 includes a sliding window accommodating programmable displayed icons which may be created by the user. Illustrated through the sliding window in this instance are selectable icons for a navigation function, phone function and climate control function. Additional icons may be brought into view in the window by touching Right-Shift key 955 or Left-Shift key 960. In addition, signal strength bars 980 on screen 410 indicate the strength of the received wireless communication signal. Navigation icon 985, an alternative to that in segment 950, is also displayed for selection of the navigation function.

In accordance with yet another aspect of the invention, a mobile device, e.g., a PCD, may be used to access a vehicle by a temporary driver who wants to borrow the vehicle from a friend or a car rental company for a limited time period. For example, the temporary driver when renting a vehicle may use PCD 130 to communicate in a wireless manner with a remote car rental agent using PCD 120. The temporary driver specifies the desired size and model of the rental vehicle, the rental period and other preferences through PCD 130 via text and/or voice media. Based on such information, the agent finds an available vehicle satisfying the desired specifications in a database in a host computer which is administered and maintained by the car rental company and to which PCD 120 is docked or connected. The agent then invokes a Vehicle Access page in the form of an E-card on PCD 120 concerning the available vehicle.

Figure 20:
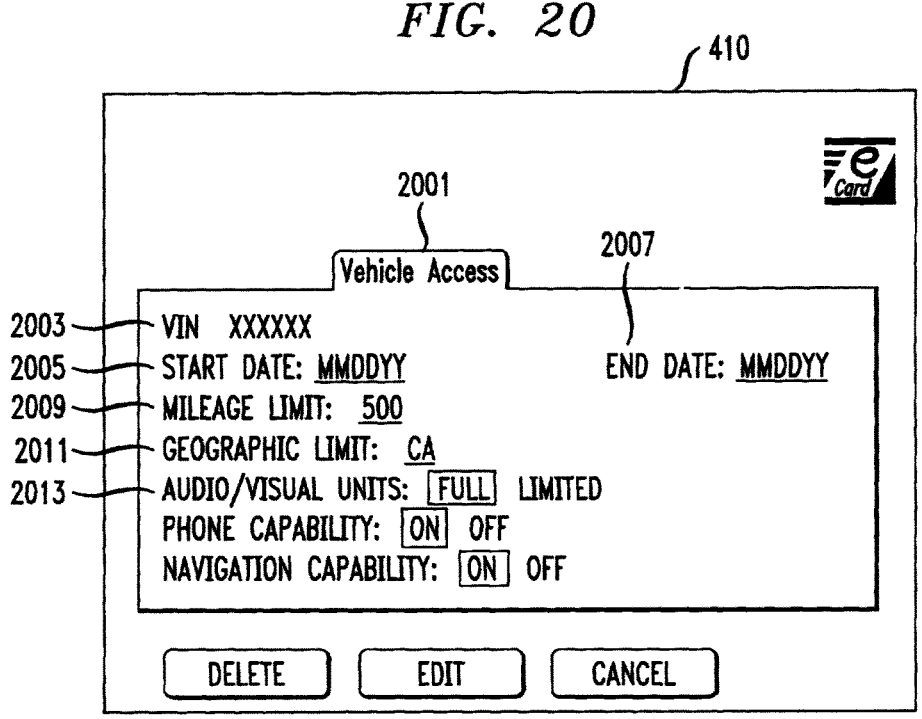
FIG. 20 illustrates an E-card for access to a vehicle.

FIG. 20 illustrates such a Vehicle Access E-Card, denoted 2001, where the available vehicle is identified by a vehicle identification number (VEST) 2003. Based on the information provided by the temporary driver, the agent enters the requested Start Date (denoted 2005) and End Date (denoted 2007) of the rental period, and the Mileage Limit (denoted 2009) during the rental period, e.g., 500 miles in this instance. In addition, the agent may also enter Geographic Limit (denoted 2011) within which the vehicle is allowed to travel, hi this instance, the agent enters CA. That is, the vehicle is not allowed to travel beyond the borders of the state of California. To that end, the host computer provides the GPS coordinates defining the California state and such GPS coordinate information is incorporated in E-Card 2001. Given the temporary driver's preferences, options which are available in the subject vehicle may accordingly be selected. The car rental company may charge a fee in addition to the basic rental fee for each of such options to be selected. Thus, for example, depending how much the temporary driver wants to spend, the agent at option 2013 may grant the driver limited or full access to the audiovisual entertainment units available in the subject vehicle. In this instance, the temporary driver is granted full access to such entertainment units.

Otherwise, if limited access is granted, the agent has to further specify those entertainment units to which the driver can have access. For example, the driver may be afforded access to a CD player, TV or game unit, besides a radio. Similarly, the driver may or may not be granted access to the phone or navigation capabilities also available in the subject vehicle.

It should be noted that the above options are for illustrative purposes. Other options may include a weight limit option whereby the agent may specify the limit of additional weight to be put on the subject vehicle, thereby limiting the number of passengers and/or amount of cargo that the temporary driver can transport in the vehicle.

The amount of the additional fee may vary with the weight limit value. Of course, where the weight limit is an option, the automobile system in the subject vehicle, similar to that described in the aforementioned '355 patent, would be capable of sensing the vehicle weight and determining the increase in the weight during the rental period. In the event that the weight increase exceeds the weight limit, the automobile system causes disablement of the vehicle, e.g., a cutoff of the gasoline supply in the vehicle. Still other options may include whether the driver can have Internet access, or access to the vehicle's engine compartment, glove compartment, trunk, etc.

After the car rental agent provides the above rental information onto E-card 2001, the aforementioned host computer generates an access code for the driver to identify himself/ herself when the driver picks up the vehicle. Such an access code is also incorporated in E-card 2001 for later verification which, in particular, is incorporated in a header of E-card 2001. Also incorporated in the header is an E-card identification, indicating that E-card 2001 is a vehicle access E-card. The host computer transmits all of the E-card information to the automobile system in the subject vehicle via a wireless communications connection, and the automobile system is accordingly programmed based on the received information.

The agent then communicates via text or voice media to the driver the access code; and the description and location of the vehicle to be picked up. Preferably, the driver records the access code and the vehicle description and location information somewhere other than PCD 130 in the event that the driver should lose PCD 130, and an unauthorized driver may then be able to gain access to the subject vehicle using the recorded information.

For security reasons, in this particular illustrative embodiment, all of the 5 information on E-card 2001, except the aforementioned E-card identification, is encrypted using a private key stored in the host computer, in accordance with a well known cryptographic methodology. One such cryptographic methodology is the RSA methodology, named after its developers, Rivest, Shamir and Adleman. For details on the RSA methodology, one may refer to: R. Rivest et al., "A Method for Obtaining Digital Signatures and Public Key Cryptosystems," Communications of the ACM, Vol. 21, No. 2, February 1978. The RSA methodology involves a public key algorithm which uses a private key and a public key for data encryption. Unlike a private key which is securely protected from the public, a public key can be published and made known to the public. The keys for the RSA algorithm are generated mathematically, and are computational inverses to each other. The success of the RSA methodology depends on the use of very large numbers for the keys.

In an alternative embodiment, the E-card information may be cryptographically signed, creating a digital signature for authenticating the E-card information.

It will be appreciated that a person skilled in the art may utilize other feasible cryptographic methodology, e.g., the digital encryption standard (DES), Triple-DES, Diffie-Hellman or pretty good privacy (PGP) methodology to achieve the above data encryption or authentication, instead.

It suffices to know for now that the public key corresponding to the aforementioned private key is stored in the automobile system in the subject vehicle. Continuing the above example, the car rental agent causes transmission of the encrypted E-card information, along with the E-card identification, from PCD 120 to PCD 130. The latter stores the received information in a Vehicle Access record therein.

Figure 21:
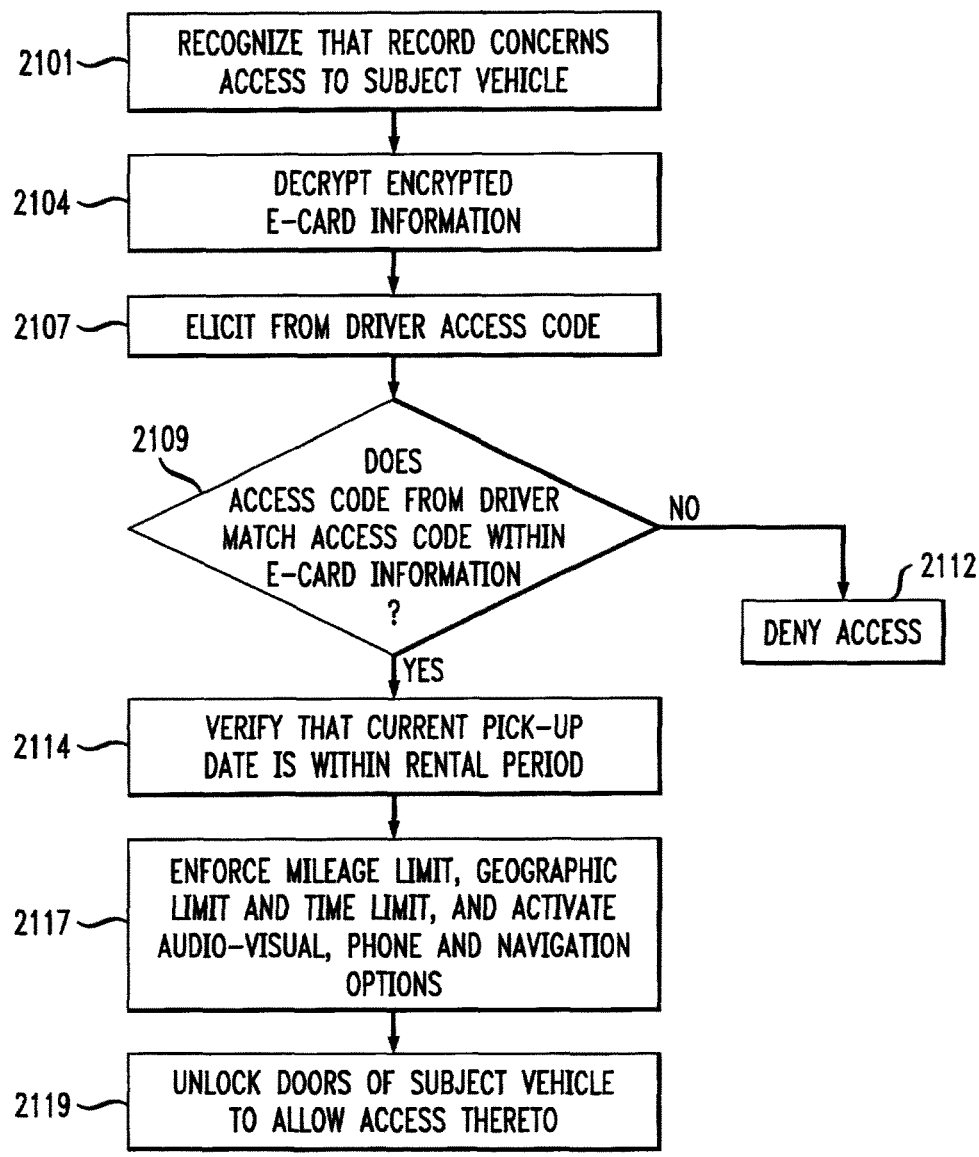
FIG. 21 is a flow chart depicting the process whereby a driver is afforded access to the vehicle based on the information on the E-card of FIG. 20.

When the temporary driver locates and picks up the subject vehicle, the driver may use PCD 130 to transmit the Vehicle Access record therein to the automobile system of the subject vehicle through wireless or Bluetooth communications. Upon receiving the Vehicle Access record, the automobile system recognizes that the record concerns access to the subject vehicle based on the E-card identification information in the record, as indicated at step 2101 in FIG. 21. In response, the automobile system at step 2104 decrypts the encrypted E-card information in the record using the public key stored in the automobile system, in accordance with the aforementioned cryptographic methodology. The automobile system is then in possession of the plaintext information concerning E-card 2001, which includes the access code previously assigned to the temporary driver. The automobile system at step 2107 elicits from the temporary driver the corresponding access code to ensure that he/she is an authorized driver. After the driver communicates the access code, previously received from the car rental agent, to the automobile system using PCD 130, the automobile system at step 2109 determines whether such an access code from the driver matches the access code within the E-card information. If they do not match, the driver is denied access, as indicated at step 2112. Otherwise, if they match, the automobile system at step 2114 verifies that the current pick-up date is within the rental period, i.e., between the start date and end date on E-card 2001. At step 2117, the automobile system enforces the mileage limit, geographic limit and time limit, and activates audiovisual, phone and navigation options specified on E-card 2001. In particular, the mileage limit is enforced with the aid of an odometer in the vehicle which provides a mileage reading to the automobile system. When the mileage consumed by the driver approaches the mileage limit, warnings may be given by the automobile system to the driver at different stages, e.g., at 50 miles before the limit, 20 miles before the limit, and 10 miles before the limit. The warnings may be communicated to the driver via text or voice media through a user interface in the automobile system which includes a display and audio facilities. Each warning indicates how many miles left before the limit, and includes information for contacting a car rental agent to extend the mileage limit. In another embodiment, the automobile system stores in a memory telephone numbers of car rental agents. At the last warning, the automobile system initiates a call to one of the agents through its phone interface. The contacted agent can then communicate with the driver to discuss any extension of the mileage limit. In yet another embodiment, the automobile system stores in the memory an access number of the aforementioned car rental company host computer. At the last warning, the automobile system establishes a communication connection with the host computer using the access number. The driver may then utilize the user interface to communicate on-line with the host computer regarding any extension of the mileage limit. Otherwise, if no mileage limit is extended despite the warnings, as soon as the automobile system detects any excessive mileage consumed by the driver, it would cause disablement of the vehicle. Similarly, the geographic limit is enforced with the aid of a GPS device in the vehicle which provides the GPS coordinates identifying the current vehicle position to the automobile system. Successive warnings are given to the driver as the vehicle approaches the borders of the geographic area (e.g., California in this instance) defined by the GPS coordinates within the E-card information. If the driver ignores such warnings and does not extend the geographic limit, as soon as the automobile system detects that the current vehicle position is outside the geographic limit, it causes disablement of the vehicle. Moreover, the time limit is enforced with the aid of a clock in the vehicle which provides time information to the automobile system. Successive warnings are given to the driver as the current time approaches the end of the rental period. If the driver ignores such warnings, and does not extend the rental period, as soon as the automobile system detects that the rental period is over, it causes disablement of the vehicle.

The automobile system at step 2119 unlocks the doors of the subject vehicle to allow access thereto by the temporary driver. However, the automobile system may provide, through its display, to the driver an access key code for subsequent re-entry to the vehicle. Alternatively, the access key code may be communicated by the automobile system directly to the driver's PCD 130. The driver may then use PCD 130 to transmit the access key code to the automobile system to re-enter the vehicle. For the security reasons, the access key code may be changed from time to time. To that end, the automobile system incorporates a key code generator for generating access key codes in a random or pseudo-random fashion. As soon as the driver produces a valid access key code to re-enter the vehicle, the automobile system operates the key code generator to provide the driver with a different access key code for subsequent re-entry.

In accordance with yet another aspect of the invention, the temporary driver may 5 also be provided with an electronic car-mail feature provided by the automobile system in the subject vehicle to receive his/her e-mail and other messages. Again, the car rental company may charge for this feature as part of the car rental fee. In order to fully appreciate the car-mail feature, the concept of car-mail will now be described. Like a conventional e-mail message, a car-mail message is formatted in accordance with well known protocols, e.g., the well known mail transfer protocol and transmission control protocol/Internet protocol (TCP/IP), and it may be delivered by conventional mail servers via a communications network such as the Internet. However, unlike e-mail whose address identifies a person for personal communications, the car-mail has an address identifying the vehicle itself. As the car-mail address appertains to or specifically associated with, the vehicle, rather than a person, e.g., the temporary driver, communications with the vehicle using car-mail is intact, regardless of who the actual vehicle user is.

A typical e-mail address is in the format of <user-id>@<domain>, e.g., "jsmith@aol.com". As is well known, the <user-id> part before the "@" sign, e.g., "jsmith", identifies the e-mail user, e.g., Joe Smith. The <domain> part after the "@" sign, e.g., "aol.com", identifies the access mail server, e.g., an American Online server connected to the Internet, providing the e-mail service for Joe Smith in this instance. However, a car-mail address is in the format of <vehicle-id>@<domain>. In this instance, the <vehicle-id> part identifies the subject vehicle which is assigned by the aforementioned car rental company host computer. The <domain> part may represent a predetermined access mail server connected to the Internet for serving the car-mail needs of vehicles. For illustrative purposes, the <domain> part may be "vehicle.com" in this example.

Figure 22:
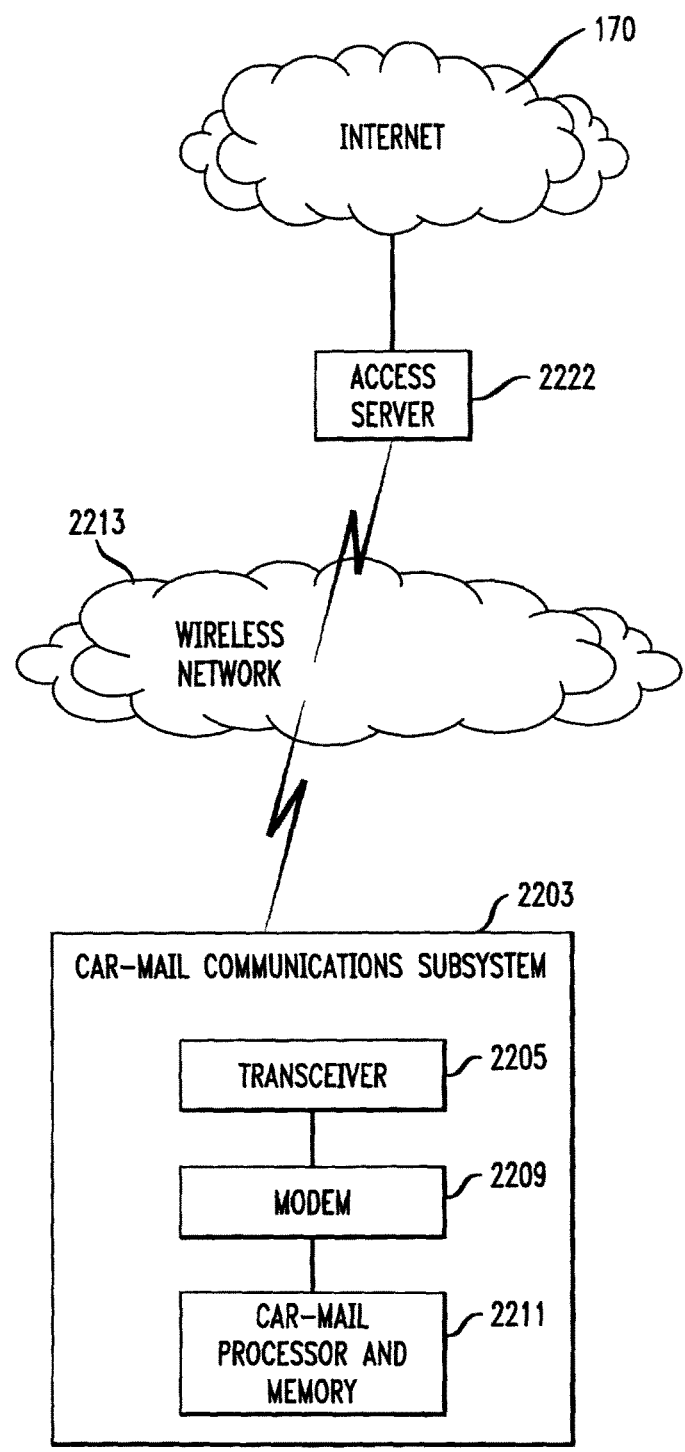
FIG. 22 illustrates an arrangement whereby car-mail in accordance with the invention is communicated to and from a vehicle through a communications network.

The assigned car-mail address is communicated by the host computer to the automobile system in the vehicle and is stored in a memory in the automobile system. The car-mail address remains unchanged during the vehicle rental period. The automobile system includes car-mail communications subsystem 2203 in FIG. 22. Subsystem 2203 further includes transceiver 2205, modem 2209, and car-mail processor and memory 2211. Transceiver 2205 includes, e.g., a wireless phone in the subject vehicle, for transmitting and receiving information via wireless network 2213, e.g., the well known advanced mobile phone service (AMPS) network, digital AMPS network, personal communications service (PCS) network, global system for mobile communications (GSM) network, paging network, hybrid personal communications network (HPCN), satellite network, microwave network, milliwave network, etc. Modem 2209 is used for modulating and demodulating carriers carrying car-mail data to and from data channels, e.g., cellular digital packet data (CDPD) channels, in wireless network 2213. To that end, processor and memory 2211 is used to compose and present car-mail messages in the subject vehicle through a user interface in the automobile system. For transmitting and receiving car-mail messages, transceiver 2205 establishes a dial-up connection through wireless network 2213 to predetermined access server 2222 which, among others, serve car-mail on Internet 170. It should be noted at this point that server 2222 may not be the only one access server on the Internet serving car-mail. It will be appreciated that more access servers similar to server 2222 are geographically distributed for effective communications of car-mail.

Continuing the above example, after the car rental company host computer assigns the car-mail address for use in the subject vehicle during the rental period, the car rental agent uses PCD 120 to communicate via text or voice media to the temporary driver the assigned car-mail address, along with other information described before. With this car-mail address, the car rental company can continually communicate information in the four of car-mail with the vehicle, as opposed to a particular person as in prior art where a personal e-mail is used. Such information may concern vehicle conditions and driving safety tips, and may include the aforementioned warnings, advisories and emergency information directed not only to the temporary driver, but also to any other users, e.g., passengers, of the vehicle. In addition, the temporary driver and other vehicle users may use the car-mail address as a conventional e-mail address and give it out to people who want to communicate with them during the rental period.

In the case where the temporary driver uses server 105 to collect and sort his/her e-mail messages in a manner described before, the temporary driver may use PCD 130 to communicate to server 105 the forwarding car-mail address such that any e-mail messages directed to him/her during the rental period can be seamlessly forwarded to the automobile system for his/her review and response.

The foregoing merely illustrates the principles of the invention. It will thus be appreciated that those skilled in the art will be able to devise numerous other systems which embody the principles of the invention and are thus within its spirit and scope.

For example, although server 105 and PCD 120, as disclosed, are embodied in the form of various discrete functional blocks, each of the server and PCD could equally well be embodied in an arrangement in which the functions of any one or more of those blocks or indeed, all of the functions thereof, are realized, for example, by one or more appropriately programmed processors or devices.

We claim:

1. A method for use in a server serving a user of a communication device, the method comprising:
   receiving, through a wireless communications network, a request for information concerning one or more product or service providers, and data indicative of a user profile and a location of the communication device determined by the communication device, the communication device being selected from the group consisting of a mobile telephone, a personal digital assistant (PDA), a tablet computing device, and a laptop computer;
   receiving from the communication device, through the wireless communications network, an identification message that identifies a device type of the communication device, the identification message being configured in accordance with a first wireless communications protocol;
   selecting, from a plurality of protocols, and based on the identification message, a second wireless communications protocol for communicating with the communication device;
   collecting requested information from one or more sources based on the received data;
   providing the requested information to the communication device in accordance with the selected second wireless communications protocol, the requested information including information concerning at least a first product or service provider in accordance with the user profile and a second product or service provider not in accordance with the user profile, wherein the first product or service provider and the second product or service provider are selected in a vicinity of the location of the communication device;
   indicating that the first product or service provider is in accordance with the user profile;
   providing data for the communication device to indicate to the user a location of the first product or service provider relative to the location of the communication device; and
   receiving from the communication device, through the wireless communications network, and after receiving the identification message, a second request for information concerning one or more product or service providers, the second request for information being configured according to the second wireless communications protocol.

2. The method of claim 1, wherein the data indicative of the location of the communication device includes global positioning system (GPS) information.

3. The method of claim 1, further including providing a direction and distance for the first product or service provider.

4. The method of claim 3, further including determining a route to the first product or service provider and providing the route to the communication device.

5. The method of claim 1, further including providing an operating status for the first product or service provider.

6. The method of claim 5, wherein the operating status indicates whether the first product or service provider is open for business.

7. The method of claim 1, wherein the one or more sources are connected to the Internet.

8. The method of claim 1, wherein the collected information is stored for the user based on one or more types of product or service provided by the first product or service provider.

9. The method of claim 1, wherein the communication device is a mobile telephone.

10. The method of claim 1, wherein the communication device is a mobile PDA.

11. The method of claim 1, wherein the communication device is a tablet computing device.

12. The method of claim 1, wherein the communication device is a laptop computer.

13. The method of claim 1 additionally comprising indicating that the second product or service provider is not in accordance with the user profile.

14. The method of claim 1 additionally comprising selecting a second wireless communications protocol driver in accordance with the identification message, and directing that the selected second wireless communications protocol driver be loaded onto the communication device.

15. The method of claim 14 additionally comprising receiving, through the wireless communications network, a notification that the second wireless communications protocol has been loaded onto the communication device.

16. The system of claim 1 additionally comprising maintaining a plurality of profiles of the user, each profile being configured for storing in memory, items of information according to a predetermined criteria, wherein the data indicative of a user profile is associated with only a selected one of the plurality of profiles.

17. The system of claim 16 additionally comprising receiving, through the communications network, an input selecting one of the plurality of profiles.

18. A system for serving a user of a communication device, the system comprising:
an interface for receiving, through a communication network, a request for information concerning one or more product or service providers, and data indicative of a user profile and a location of the communication device determined by the communication device, the communication device being selected from the group consisting of a mobile telephone, a personal digital assistant (PDA), a tablet computing device, and a laptop computer;
a plurality of protocol drivers that can be loaded over the internet onto the communication device, a first one of the protocol drivers being compatible with the communication device, a second one of the protocol drivers being incompatible with the communication device but compatible with a second communication device;
a processing unit configured to collect requested information from one or more sources based on the received data; and
an output element for providing the requested information to the communication device, the requested information including information concerning at least a first product or service provider, in accordance with the user profile and a second product or service provider not in accordance with the user profile, wherein the first product or service provider and the second product or service provider are selected in a vicinity of the location of the communication device, the output element being configured to indicate which of the first and second product or service providers are in accordance with the user profile and to provide data for the communication device to indicate to the user a location of the first product or service provider relative to the location of the communication device;
wherein the output element is configured to provide the requested information to the communication device in accordance with a first communication protocol if the first one of the protocol drivers is loaded onto the communication device.

19. The method of claim 18, wherein the data indicative of the location of the communication device includes global positioning system (GPS) information.

20. The method of claim 18, further including providing a direction and distance for the first product or service provider.

21. The method of claim 20, further including determining a route to the first product or service provider.

22. The method of claim 18, further including providing an operating status for the first product or service provider.

23. The method of claim 22, wherein the operating status indicates whether the first product or service provider is open for business.

24. The method of claim 18, wherein the one or more sources are connected to the Internet.

25. The method of claim 18, wherein the collected information is stored for the user based on one or more types of product or service provided by the first product or service provider.

26. The method of claim 18, wherein the communication device is a mobile telephone.

27. The method of claim 18, wherein the communication device is a mobile PDA.

28. The method of claim 18, wherein the communication device is a tablet computing device.

29. The method of claim 18, wherein the communication device is a laptop computer.

30. The system of claim 18, wherein the system is configured to identify a type of the communication device, to select the first one of the protocol drivers based on the identified type, and to direct loading of the selected first one of the protocol drivers onto the communication device.

31. The system of claim 30, wherein the system is configured to receive a notification from the communication device that the first one of the protocol drivers has been installed onto the communication device, and the system is configured to provide the requested information to the communication device in accordance with the first communication protocol after receiving the notification.

32. The system of claim 18, wherein the system is configured to maintain in memory a plurality of profiles of the user, each profile being configured for storing in memory, items of information according to a predetermined criteria, and wherein the data indicative of a user profile comprises data from a selected one of the plurality of profiles.

33. A method for use in a server serving a user of a communication device, the method comprising:
maintaining a plurality of profiles of the user, each profile being configured for storing in memory, items of information according to a predetermined criteria;
receiving, through a communication network, requests for information from the communication device intended for the user;
collecting requested information from one or more sources intended for the user according to the plurality of profiles;

processing the collected information to determine at least one profile of the plurality of profiles for storing items included in the collected information;

storing the collected information in accordance with the determined at least one profile; and providing, over the communication network, the collected information to the communication device according to a profile of the plurality of profiles selected by the user, wherein the communication device is selected from the group consisting of a mobile telephone, a personal digital assistant (PDA), a tablet computing device, and a laptop computer.

34. The method of claim 33, wherein the profiles include a personal profile.

35. The method of claim 33, wherein the collected information includes at least one email message from a personal email account of the user.

36. The method of claim 33, wherein the collected information includes at least one personal contact.

37. The method of claim 33, wherein the collected information includes a notification from at least one contact of a predetermined group of contacts.

38. The method of claim 33, wherein the notification includes aggregated messages from the predetermined group of contacts, the aggregated messages comprising a social media newsfeed.

39. The method of claim 33, wherein the profiles include a business profile.

40. The method of claim 39, wherein the collected information includes at least one email message from a business email account of the user.

41. The method of claim 39, wherein the collected information includes at least one business contact.

42. The method of claim 39, wherein the one or more sources are connected to the Internet.

43. The method of claim 33, wherein the communication device is a mobile telephone.

44. The method of claim 33, wherein the communication device is a mobile PDA.

45. The method of claim 33, wherein the communication device is a tablet computing device.

46. The method of claim 33, wherein the communication device is a laptop computer.

47. The system of claim 33, comprising storing items included in the collected information in at least two profiles of the plurality of profiles.

48. A system for serving a user of a communication device comprising:

a storage for maintaining a plurality of profiles of the user, each profile being configured for storing in memory, items of information according to a predetermined criteria;

an interface for receiving, through a communication network, requests for information from the communication device intended for the user;

a processor for collecting requested information from one or more sources intended for the user according to the plurality of profiles, determining at least one profile of the plurality of profiles for storing items included in the collected information, and storing the collected information in the storage in accordance with the determined profile; and an output for providing the collected information to the communication device according to a profile of the plurality of profiles selected by the user, wherein the communication device is selected from the group consisting of a mobile telephone, a personal digital assistant (PDA), a tablet computing device, and a laptop computer.

49. The system of claim 48, wherein the plurality of profiles include a personal profile.

50. The system of claim 49, wherein the collected information includes at least one email message from a personal email account of the user.

51. The system of claim 49, wherein the collected information includes at least one personal contact.

52. The system of claim 48, wherein the collected information includes a notification from one of a predetermined group of contacts.

53. The system of claim 48, wherein the notification includes aggregated messages from the predetermined group of contacts, the aggregated messages comprising a social media newsfeed.

54. The system of claim 48, wherein the profiles include a business profile.

55. The system of claim 54, wherein the collected information includes at least one email message from a business email account of the user.

56. The system of claim 54, wherein the collected information includes at least one business contact.

57. The system of claim 48, wherein the one or more sources are connected to the Internet.

58. The method of claim 48, wherein the communication device is a mobile telephone.

59. The method of claim 48, wherein the communication device is a mobile PDA.

60. The method of claim 48, wherein the communication device is a tablet computing device.

61. The method of claim 48, wherein the communication device is a laptop computer.

62. A method for use in a server serving a user of a communication device, the method comprising:

receiving through a communication network, information including data indicative of a user profile and a location of the communication device, the communication device being selected from the group consisting of a mobile telephone, a personal digital assistant (PDA), a tablet computing device, and a laptop computer, the data indicative of a location including image data and global positioning system (GPS) information, the information including aggregated messages from a predetermined group of contacts, the aggregated messages comprising a social media newsfeed;

determining a location of the user based on the data received; and outputting, via the communication network a notification including the determined location of the user in accordance with the user profile, the social media newsfeed being included in the notification.

63. The method of claim 62, wherein the data indicative of the location of the communication device includes global positioning system (GPS) information.

64. The method of claim 62, wherein the notification includes outputting an image in accordance with the user profile.

65. The method of claim 62, wherein the information includes a message intended for a group in accordance with the user profile, the message being included in the notification.

66. The method of claim 65, wherein an image in accordance with the user profile is included in the notification.

67. The method of claim 66, wherein audio data associated with the image is included in the notification.

68. The method of claim 62, wherein the communication device is a mobile telephone.

69. The method of claim 62, wherein the communication device is a mobile PDA.

70. The method of claim 62, wherein the communication device is a tablet computing device.

71. The method of claim 62, wherein the communication device is a laptop computer.

72. The method of claim 62, comprising transmitting the notification to another party.

73. The method of claim 72, wherein the notification includes outputting an image in accordance with the user profile.

74. The method of claim 73, wherein the image is synchronized with data.

75. The method of claim 74, wherein the data synchronized with the image comprises a time the user was at a location.

76. The method of claim 75, wherein the communication device comprises a digital camera capable of capturing an image, and additionally comprising receiving through the communication network a digital image captured by the digital camera.

\* \* \* \* \*